United States Patent
Keegan et al.

(10) Patent No.: US 9,261,576 B2
(45) Date of Patent: Feb. 16, 2016

(54) NAVIGATION USING RANGE MEASUREMENTS TO OFDM TRANSMITTERS

(71) Applicant: Deere & Company, Moline, IL (US)

(72) Inventors: Richard G. Keegan, Palos Verdes Estates, CA (US); Jerry E. Knight, Long Beach, CA (US)

(73) Assignee: DEERE & COMPANY, Moline, IL (US)

( * ) Notice: Subject to any disclaimer, the term of this patent is extended or adjusted under 35 U.S.C. 154(b) by 438 days.

(21) Appl. No.: 13/784,665

(22) Filed: Mar. 4, 2013

(65) Prior Publication Data

US 2014/0070997 A1  Mar. 13, 2014

Related U.S. Application Data

(60) Provisional application No. 61/699,798, filed on Sep. 11, 2012.

(51) Int. Cl.
G01S 3/02 (2006.01)
G01S 19/46 (2010.01)
G01S 5/14 (2006.01)
G01S 5/02 (2010.01)
G01S 11/02 (2010.01)
G01S 11/08 (2006.01)

(52) U.S. Cl.
CPC .............. *G01S 3/02* (2013.01); *G01S 5/0221* (2013.01); *G01S 5/145* (2013.01); *G01S 11/02* (2013.01); *G01S 11/08* (2013.01); *G01S 19/46* (2013.01)

(58) Field of Classification Search
CPC .............. G01S 3/02; G01S 3/52; G01S 5/10; G01S 19/37; G01S 5/0221; G01S 11/02; G01S 11/08
USPC .............. 342/458, 418, 357.78, 357.77
See application file for complete search history.

(56) References Cited

U.S. PATENT DOCUMENTS

| | | | |
|---|---|---|---|
| 6,243,587 B1 * | 6/2001 | Dent et al. | 455/456.2 |
| 6,618,352 B1 * | 9/2003 | Shirakata et al. | 370/203 |
| 7,800,541 B2 * | 9/2010 | Moshfeghi | 342/465 |
| 8,130,141 B2 | 3/2012 | Pattabiraman et al. | |
| 2009/0213943 A1 * | 8/2009 | Gu et al. | 375/260 |
| 2009/0323790 A1 * | 12/2009 | Yousef | 375/224 |
| 2010/0220012 A1 | 9/2010 | Reede | |

(Continued)

OTHER PUBLICATIONS

International Search Report and Written Opinion of the International Searching Authority, Dec. 17, 2013 (12 pages).

(Continued)

*Primary Examiner* — Harry Liu
(74) *Attorney, Agent, or Firm* — Morgan, Lewis & Bockius LLP

(57) ABSTRACT

A signal receiver receives a time-domain signal that includes a plurality of pilot tones at a plurality of corresponding frequencies. The time-domain signal is transmitted from a transmit location. The signal receiver extracts from the received time-domain signal pilot phase values corresponding to the pilot tones. The signal receiver computes a signal propagation time of the received time-domain signal by fitting an interpolation function to residual pilot phase values, corresponding to the extracted pilot phase values, and determines a slope of the interpolation function. The signal receiver computes a range between the transmit location and the signal receiver by multiplying the computed signal propagation time with the speed of light.

24 Claims, 9 Drawing Sheets

(56) References Cited

U.S. PATENT DOCUMENTS

2010/0279707 A1    11/2010    Fischer et al.
2011/0002371 A1*    1/2011    Forenza et al. ............... 375/227
2013/0121392 A1*    5/2013    Thompson et al. ........... 375/227

OTHER PUBLICATIONS

International Search Report and Written Opinion of the International Searching Authority, Dec. 12, 2013 (17 pages).

Dai et al. Positioning with OFDM Signals for the Next-Generation GNSS. IEEE Transactions on Consumer Electronics, vol. 56, No. 2. May 2010 [retrieved on Dec. 2, 2013] Retrieved from the internet: ,URL: http://eeexploreieee.org/xpl/login.jsp?tp=&arnumber=5505942&url-http%3A52F%2Fieeexplore.ieee.org%2Fxpls%2Fabs_all.jsp%3Farnumber%3D5505942. entire document.

* cited by examiner

US 9,261,576 B2

NAVIGATION USING RANGE MEASUREMENTS TO OFDM TRANSMITTERS

RELATED APPLICATIONS

This application claims priority to U.S. Provisional Patent Application No. 61/699,798, filed Sep. 11, 2012, which is hereby incorporated by reference in its entirety.

TECHNICAL FIELD

The disclosed embodiments relate generally to the field of signal processing at a signal receiver and in particular to a method and system for performing navigation at a signal receiver using range measurements to OFDM transmitters.

BACKGROUND

Satellite signal receivers (e.g., GPS/Global Positioning System receivers, such as those used in automotive applications) perform various navigation functions, by continuously computing and updating navigation parameters such as their ranges to satellites, their respective geographical locations and coordinates, and their speeds and velocities of motion in different directions.

SUMMARY

In accordance with some embodiments, a system and method for performing terrestrial navigation compute a range between a transmit location and a signal receiver through a determination of signal propagation time, by computing relative measures (e.g., differences) between computed phases of two or more designated orthogonal signals (e.g., of two or more pilot tones) transmitted by terrestrial transmitters.

Alternative embodiments provide a system and method for performing navigation by computing a range between a transmit location and a signal receiver by correlating designated signal patterns (e.g., pilot tones) received from transmit locations (e.g., terrestrial transmitters) with locally stored (at the signal receiver) templates of the designated signal patterns, to obtain a signal propagation time and range to the transmit locations In some embodiments, a method of computing a range between a transmit location and a signal receiver is performed at a signal receiver system having one or more processors and memory storing one or more programs for execution by the one or more processors so as to perform the method. The method includes receiving, at the signal receiver, a time-domain signal that includes a plurality of pilot tones at a plurality of corresponding frequencies, where the time-domain signal is transmitted from a transmit location. The method further includes extracting from the received time-domain signal pilot phase values corresponding to the pilot tones. The method also includes computing a signal propagation time of the received time-domain signal by fitting an interpolation function to residual pilot phase values, corresponding to the extracted pilot phase values, and determining a slope of the interpolation function. Further, the method includes computing a range between the transmit location and the signal receiver by multiplying the computed signal propagation time with the speed of light.

In some embodiments, a method of computing speed of the signal receiver is performed at a signal receiver system. The method includes computing a first set of ranges, including said computed range, using signals received from a set of transmit locations at the signal receiver at a first time. The method further includes computing a second set of ranges using the same signals received from the set of transmit locations at the signal receiver at a second time. The method also includes computing a set of range change rates based on the first set of ranges, the second set of ranges and a difference between the second time and the first time. Further, the method includes computing a speed of the signal receiver by combining the set of range change rates, where each range in the first set of ranges being computed by fitting an interpolation function to residual pilot phase values, corresponding to extracted pilot phase values, for a respective signal received by the signal receiver and determining a slope of the interpolation function.

In accordance with some embodiments, a signal receiver system includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein instructions which when executed by one or more processors, cause the signal receiver system to perform the operations of the methods described above.

BRIEF DESCRIPTION OF THE DRAWINGS

Like reference numerals refer to corresponding parts throughout the drawings.

DESCRIPTION OF EMBODIMENTS

Figure 1:
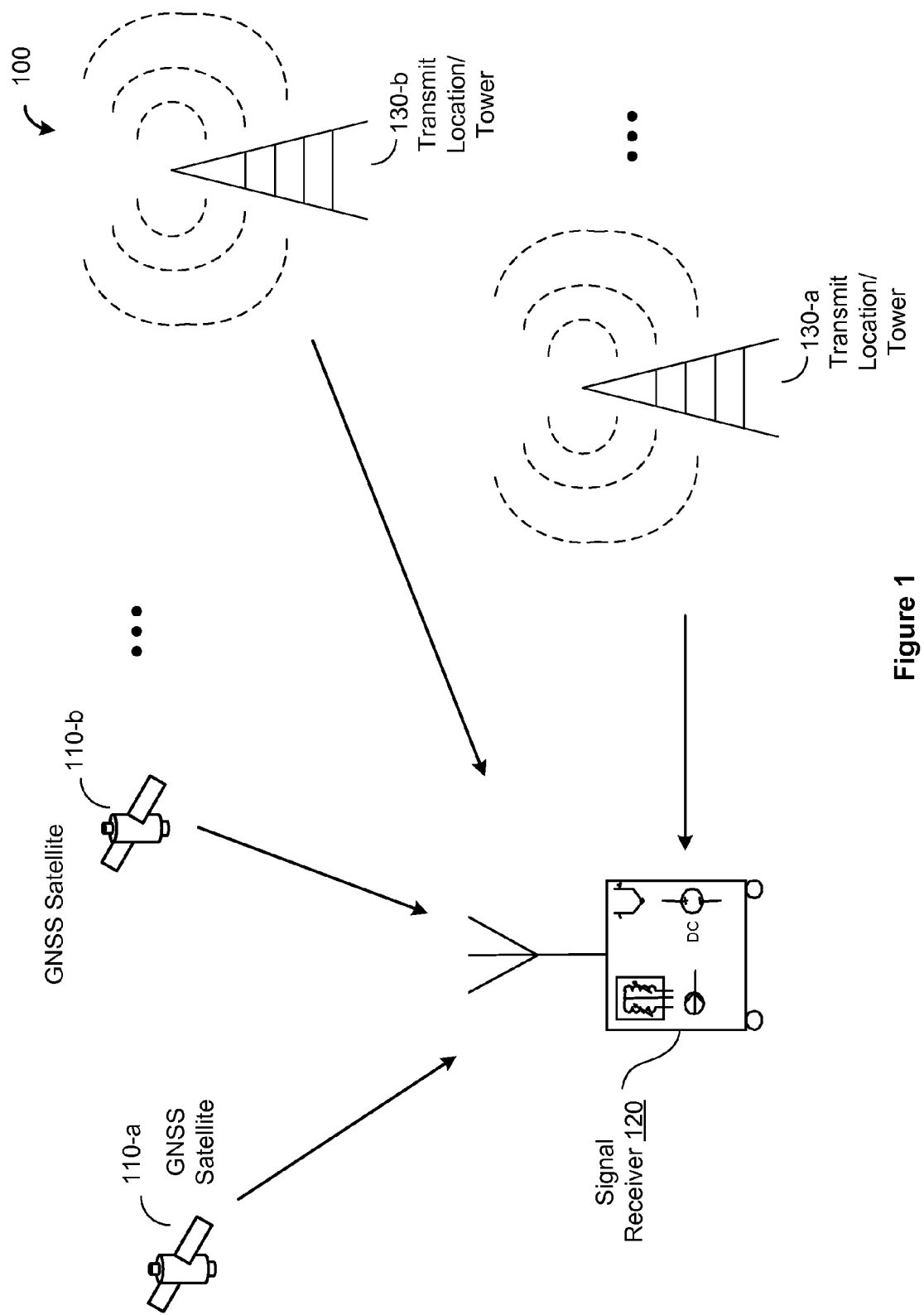
FIG. 1 illustrates a navigation system including a GNSS navigation system, one or more terrestrial transmitters and a signal receiver, in accordance with some embodiments.

Satellite signal receivers for computing various-mentioned navigation parameters rely on obtaining multiple concurrent GNSS (Global Navigation Satellite Systems) or satellite signals. The multiple concurrently-obtained signals from satellites facilitate conventional triangulation-based navigation.

However, satellite-based triangulation approaches to navigation are highly reliant on establishment of multiple simultaneous robust satellite links on a consistent and/or continuous basis. Furthermore, satellite communication links are susceptible to disruption by environmental factors (e.g., weather conditions), physical factors (e.g., the absence or obstruction of direct or line of sight satellite signal propagation paths due to physical natural obstructions such as dense foliage, mountainous terrain, etc.), and man-made factors (e.g., physical obstructions from man-made structures such as buildings; signal degradation from electromagnetic interference).

Systems and methods are described below that reduce reliance on satellite signals for navigation, by using local, terrestrial transmitters that transmit designated orthogonal signals (such as pilot tones) at designated frequencies to facilitate navigation. The use of local, terrestrial transmitters improves navigation capabilities of a signal receiver by providing higher signal fidelity and improved robustness to environmental factors, thereby reducing the time required to resolve the signal receiver's location and/or speed.

It will be understood that, although the terms "first," "second," etc. may be used herein to describe various elements, these elements should not be limited by these terms. These terms are only used to distinguish one element from another. For example, a first signal could be termed a second signal, and, similarly, a second signal could be termed a first signal, without changing the meaning of the description, so long as all occurrences of the "first signal" are renamed consistently and all occurrences of the second signal are renamed consistently. The first signal and the second signal are both signals, but they are not the same signal.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context. The term "pilot tones" are herein defined to mean orthogonal signals at known or predefined frequencies, typically at equally spaced frequencies in a predefined range of frequencies, having predefined data or signal patterns to facilitate identification and locking onto the pilot tones.

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

FIG. 1 includes a block diagram illustrating a navigation system (e.g., Navigation System 100) comprising a satellite navigation system (e.g., a Global Navigation Satellite System (GNSS) composed of one or more satellites), a terrestrial navigation system (e.g., composed of one or more terrestrial transmit towers), and a signal receiver (e.g., Signal Receiver 120) for performing navigation functions.

Accordingly, Navigation System 100 includes one or more satellites (e.g., GNSS Satellite(s) 110). GNSS satellite(s) 110 transmit signals (e.g., signals containing navigation information) to be received by Signal Receiver 120. In some embodiments, GNSS satellite(s) 110 transmit(s) signals in frequency bands corresponding to the L1 frequency band (e.g., a frequency band that includes 1559 MHz-1591 MHz, or a portion thereof), the L2 frequency band (e.g., a frequency band that includes 1211 MHz-1243 MHz, or a portion thereof), and/or the L5 frequency band (e.g., a frequency band that includes 1160 MHz-1192 MHz, or a portion thereof).

Navigation System 100 further includes a terrestrial navigation system comprising one or more Transmit Location(s)/Tower(s) 130. In some embodiments, the one or more Transmit Location(s)/Tower(s) 130 correspond to or include terrestrial transmitters. The one or more Transmit Location(s)/Tower(s) 130 transmit one or more corresponding time-domain signals that each include a plurality of pilot tones at a plurality of corresponding frequencies (i.e., each pilot tone is transmitted at a respective corresponding frequency). In some implementations, the one or more Transmit Location(s)/Tower(s) 130 correspond to or include OFDM transmitters (e.g., transmitters that transmit Orthogonal Frequency Division Multiplexed or OFDM signals). In such implementations, the plurality of pilot tones correspond to OFDM pilot tones and are mutually orthogonal signals. In such embodiments, at a frequency value corresponding to maximum spectral value (e.g., peak power) of a respective pilot tone (corresponding to a respective pilot tone frequency), the spectral value (e.g., the power) of each of the other pilot tones in the plurality of pilot tones is negligible (e.g., each of the other pilot tones in the plurality of pilot tones has zero power). Further as an example, if the OFDM tones (also referred to herein as sub-carriers) correspond to OFDM signal frequencies $F_1$, $P_1$, $F_2$, $P_2$, $F_3$, $F_4$, $F_5$, $F_6$, $F_7$, $P_3$, $P_4$, $F_8$, $F_9$, $F_{10}$, $P_5$, $P_6$, $F_{11}$, $F_{12}$, $P_7$ MHz, the plurality of pilot tones occur at designated frequencies forming a subset of the frequencies of the OFDM tones (also referred to herein as sub-carriers) which are defined, for example, by LTE (Long Term Evolution) specifications. In this example, the plurality of pilot tones occur at designated frequencies $P_1$, $P_2$, $P_3$, $P_4$, $P_5$, $P_6$, and $P_7$ MHz.

Further, in such embodiments, the duration (or symbol period) of the OFDM time-domain signal is equal to, or an integral multiple of, the inverse of the frequency spacing (e.g., sub-carrier frequency spacing) between the consecutive, orthogonal sub-carrier or OFDM tone frequencies (of which the pilot tone frequencies form a subset). With respect to Orthogonal Frequency Division Multiplexing (OFDM), U.S. Pat. No. 3,488,445, "Orthogonal Frequency Multiplex Data Transmission System" is hereby incorporated by reference as background information.

Signal Receiver 120 receives signals from the satellite navigation system (e.g., GNSS signals from GNSS Satellite(s) 110) and/or from the terrestrial navigation system (e.g., OFDM signals from the Transmit Location(s)/Tower(s) 130) and processes the satellite (e.g., GNSS) signals and the terrestrial (e.g., OFDM) signals individually or in combination to perform a navigation function (e.g., to compute a range between the transmit location and the signal receiver and/or to compute a speed of the signal receiver). Accordingly, Signal Receiver 120 includes analog and digital circuitry for pre-processing the signals received from the terrestrial navigation system (e.g., OFDM signals). Signal Receiver 120 also includes analog and digital circuitry for pre-processing the signals received from the satellite navigation system (e.g., GNSS signals). Signal Receiver 120 includes signal conditioning elements (e.g., filters and amplifiers) in the analog signal processing circuitry that selectively emphasize signals having frequencies of interest, and reject or attenuate signals that do not have frequencies within the frequency band(s) of interest.

Figure 2:
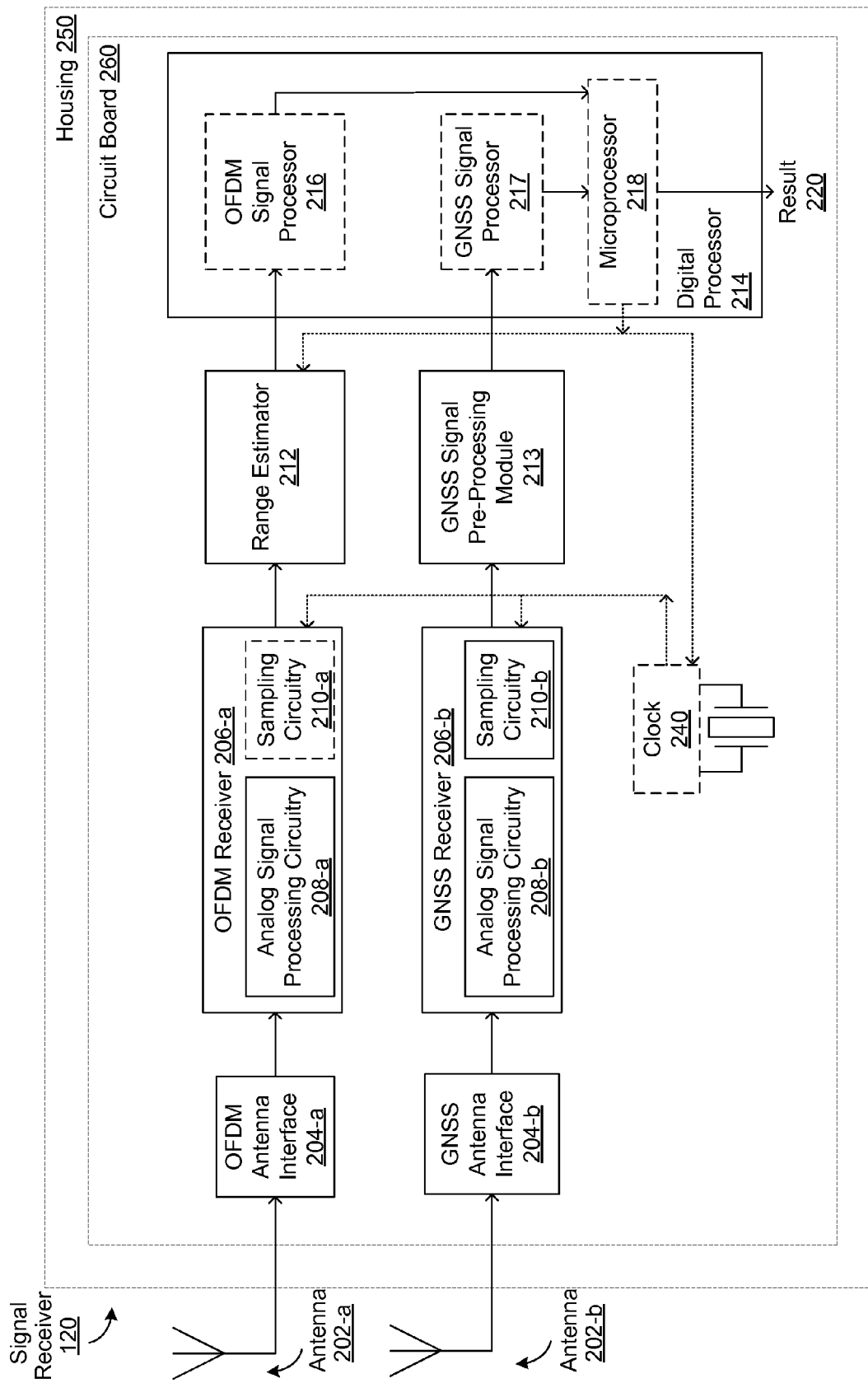
FIG. 2 is a block diagram illustrating a signal receiver used for navigation based on range and speed estimation, in accordance with some embodiments.

FIG. 2 is a block diagram illustrating Signal Receiver 120 in accordance with some embodiments. In some embodiments, Signal Receiver 120 receives signals from one or more Transmit Location(s)/Tower(s) 130 (e.g., Transmit Location/Tower 130-a, Transmit Location/Tower 130-b, and the like) via Antenna 202-a and from one or more GNSS Satellite(s) 110 (GNSS Satellite 110-a, GNSS Satellite 110-b, and the like) via Antenna 202-b. In some embodiments, Antenna 202-a is tuned or tunable to frequencies corresponding to OFDM signal frequencies—e.g., as defined by LTE/Long Term Evolution specifications (as explained with reference to FIG. 3A). In some implementations, Antenna 202-b is tuned or tunable to frequencies (e.g., frequency bands) corresponding to GNSS signal frequencies (as explained with reference to FIG. 3A).

Signal Receiver 120 includes analog and digital signal processing circuitry (e.g., OFDM Antenna Interface 204-a and OFDM Receiver 206-a) to pre-process time-domain signals (e.g., OFDM signals) obtained from one or more Transmit Location(s)/Tower(s) 130. OFDM Receiver 206-a includes Analog Signal Processing Circuitry 208-a and optionally, Sampling Circuitry 210-a. Analog Signal Processing Circuitry 208-a is coupled to Antenna Interface 204-a for processing the received signals to produce filtered signals. In some embodiments, Analog Signal Processing Circuitry 208-a includes various frequency, amplitude, and phase conditioning components, such as, one or more analog filters and/or one or more gain (e.g., amplification) stages. In some embodiments, Analog Signal Processing Circuitry 208-a corresponds to or includes a low noise amplifier. Sampling Circuitry 210-a optionally samples the filtered signals from Analog Signal Processing Circuitry 208 so as to produce digital representation(s) of the received time-domain signals. In some embodiments, circuitry for producing the digital representation(s) of the received time-domain signals further includes quantization circuitry and digitization circuitry. Signal Receiver 120 further includes Range Estimator 212 to process the time-domain signals received from the one or more Transmit Location(s)/Tower(s) 130 to compute a range between the corresponding Transmit Location(s)/Tower(s) 130 and Signal Receiver 120 (as explained further with reference to FIG. 3B).

Furthermore, Signal Receiver 120 includes analog and digital signal processing circuitry (e.g., GNSS Antenna Interface 204-b and GNSS Receiver 206-b) to pre-process time-domain signals (e.g., GNSS signals) obtained from one or more GNSS Satellite(s) 110. GNSS Receiver 206-b includes Analog Signal Processing Circuitry 208-b and Sampling Circuitry 210-b. Analog Signal Processing Circuitry 208-b is coupled to Antenna Interface 204-b for processing the received GNSS signals to produce filtered signals. As explained above with reference to Analog Signal Processing Circuitry 208-a operable on time-domain signals (e.g., OFDM signals) obtained from one or more Transmit Location(s)/Tower(s) 130, in some embodiments, Analog Signal Processing Circuitry 208-b includes various frequency, amplitude and phase conditioning components, such as one or more analog filters and/or one or more gain (amplification) stages. The frequency, amplitude and phase conditioning components that constitute Analog Signal Processing Circuitry 208-b optionally have different frequency, amplitude, and phase conditioning properties than the corresponding frequency, amplitude and phase conditioning components compared to Analog Signal Processing Circuitry 208-a. In some embodiments, Analog Signal Processing Circuitry 208-b corresponds to or includes a low noise amplifier.

Sampling Circuitry 210-b samples the filtered signals from Analog Signal Processing Circuitry 208-b so as to produce digitized signals corresponding to the received time-domain GNSS signals. In some embodiments, circuitry for producing the digitized received signals further includes quantization circuitry and digitization circuitry. In some implementations, Analog Signal Processing Circuitry 208-b includes a demodulator to down-convert the received GNSS signals to produce baseband signals. Signal Receiver 120 further includes GNSS Signal Pre-Processing Module 213 to process the time-domain signals received from the one or more Satellite(s) 110 to augment navigation functions (e.g., to be used in conjunction with or independently from navigation parameters, such as range, location and/or speed computed by Range Estimator 212 based on the time domain signals received from the one or more Transmit Location(s)/Tower(s) 130) performed by Signal Receiver 120. GNSS Signal Pre-Processing Module 213 optionally includes compensation circuitry to compensate for amplitude and/or group delay distortions introduced by Antenna Interface 204-b and/or Analog Signal Processing Circuitry 208-b.

Signal Receiver 120 optionally includes a separate Antenna Interface 204-b, GNSS Receiver(s) 206-b and/or GNSS Signal Pre-Processing Module 213 for each frequency band of interest, for example, the L1 (e.g., 1575.42±16 MHz; or 1559 MHz-1591 MHz), L2 (e.g., 1227.6±16 MHz; or 1211 MHz-1243 MHz) and L5 (e.g., 1176.45±16 MHz; or 1160 MHz-1192 MHz) frequency bands.

It should be understood that the frequency bands described in this document (such as L1, L2, and L5 frequency bands) are merely illustrative and representative; the signal receiver and methods performed by the signal receiver described herein can be configured to operate at frequency bands or frequencies not specifically listed here.

Additionally, Signal Receiver 120 also includes Digital Processor 214, Clock 240, Housing 250, and Circuit Board 260.

Digital Processor 214 processes the navigation parameters obtained from Range Estimator 212 and/or GNSS Signal Pre-Processing Module 213 so as to produce a Result 220. In some implementations, the result (e.g., Result 220) includes a range to a satellite, ranges to multiple satellites, a range to a transmit location (e.g., a terrestrial transmitter), ranges to multiple transmit locations (e.g., terrestrial transmit locations), navigation result(s), geographical location(s), and/or satellite time value(s). In some embodiments, Digital Processor 214 is implemented using one or more microprocessors or other programmable processors. Digital Processor 214 is further described herein with reference to FIG. 4. In some implementations, Digital Processor 214 is configured to operate on baseband signals.

In some embodiments, Digital Processor 214 includes Microprocessor 218, optionally includes OFDM Signal Processor 216, and optionally includes GNSS Signal Processor 217. GNSS Signal Processor 217, if present, typically includes circuitry, such as correlators, for analyzing signals received from GNSS Satellite(s) 110 and thereby assisting Microprocessor 218 to perform navigation functions and optionally other functions. Digital Processor 214 includes and executes control instructions for controlling synchronized sampling of the received OFDM signals based on the duration and start of the symbol period. Digital Processor 214 (e.g., Microprocessor 218) provides pilot tone frequencies (e.g., by referencing an almanac or from LTE specifications) to Range Estimator 212 (e.g., to compute the range between respective Transmit Location(s)/Tower(s) 130 and Signal Receiver 120). In some embodiments, Digital Processor 214 (e.g., OFDM Signal Processor 216) includes a circuitry corresponding to a speed estimation module that computes a speed of Signal Receiver 120 (e.g., as described in further detail in relation to Method 600, operations 628-636) by computing a set of range change rates from a set of ranges (E.g., provided by Range Estimator 212), and by subsequently combining the set of range change rates.

In some embodiments, Clock 240 provides synchronized clock timing signals to Sampling Circuitry 210-*a* and Sampling Circuitry 210-*b*. In some implementations, Clock 240 receives control instructions from Digital Processor 214 for synchronized sampling of the received OFDM signals based on the duration and start of the OFDM symbol period, as described further below.

In some embodiments, OFDM Antenna Interface 204-*a*, OFDM Receiver 206-*a*, Range Estimator 212, GNSS Antenna Interface 204-*b*, GNSS Receiver 206-*b*, GNSS Signal Pre-Processing Module 213, Digital Processor 214 and Clock 240 are all contained within a Housing 250.

In some embodiments, OFDM Antenna Interface 204-*a*, OFDM Receiver 206-*a*, Range Estimator 212, GNSS Antenna Interface 204-*b*, GNSS Receiver 206-*b*, GNSS Signal Pre-Processing Module 213, Digital Processor 214 and Clock 240 are mounted on a single circuit board (e.g., Circuit Board 260). Alternatively, OFDM Antenna Interface 204-*a* and/or GNSS Antenna Interface 204-*b* is/are not mounted on the circuit board on which the other components are mounted. Typically, in embodiments that include Housing 250, Circuit Board 260 is contained within Housing 250.

Figure 3A:
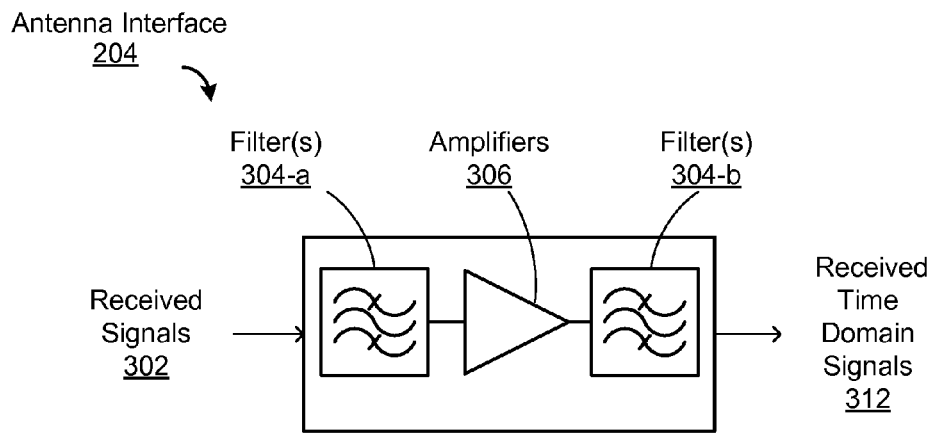
FIGS. 3A-3D include block diagrams illustrating components of a signal receiver used for navigation based on range and speed estimation, in accordance with some embodiments.

FIG. 3A is a block diagram illustrating an Antenna Interface 204 (e.g., OFDM Antenna Interface 204-*a* or GNSS Antenna Interface 204-*b*, FIG. 2) in accordance with some embodiments. As shown in FIG. 3A, Antenna Interface 204 includes one or more filters (e.g., Filter(s) 304-*a* and Filter(s) 304-*b*) to limit the frequencies of Received Signals 302 to frequencies of interest. Filter(s) 304-*a* and Filter(s) 304-*b* include filters with fixed or variable (e.g., tunable) properties. Antenna Interface 204 also includes one or more Amplifiers 306 for amplifying or strengthening signals of interest. Amplifiers 306 may include one or more amplifiers with fixed or variable (e.g., tunable) properties. While FIG. 3A represents a general architecture for Antenna Interface 204, the specific properties (e.g., corner frequencies of Filter(s) 304-*a* and Filter(s) 304-*b* and/or amplification gains of Amplifiers 306) would be different for different applications (e.g., different for OFDM Antenna Interface 204-*a* and for GNSS Antenna Interface 204-*b*) and for interfacing with signals having different frequencies of interest and/or different amplitudes. For example, Antenna Interface 204 when configured as OFDM Antenna Interface 204-*a* (as shown in FIG. 2) is configured to operate at one or more predefined OFDM frequency bands (e.g., 1.4 MHz to 20 MHz, with 15 kHz sub-carrier spacing, as defined by the LTE specification, or the frequency bands of any other OFDM signal, whether currently existing or built in the future) of the respective Transmit Location(s)/Tower(s) 130 (FIG. 1) and/or to adjust amplitudes of the OFDM signals. Also for example, Antenna Interface 204 when configured as GNSS Antenna Interface 204-*b* (as shown in FIG. 2) is configured to operate at one or more of the L1 (e.g., 1575.42±16 MHz; or 1559 MHz-1591 MHz), L2 (e.g., 1227.6±16 MHz; or 1211 MHz-1243 MHz) and/or L5 (e.g., 1176.45±16 MHz; or 1160 MHz-1192 MHz) frequency bands and/or to adjust amplitudes of the GNSS signals.

Figure 3B:
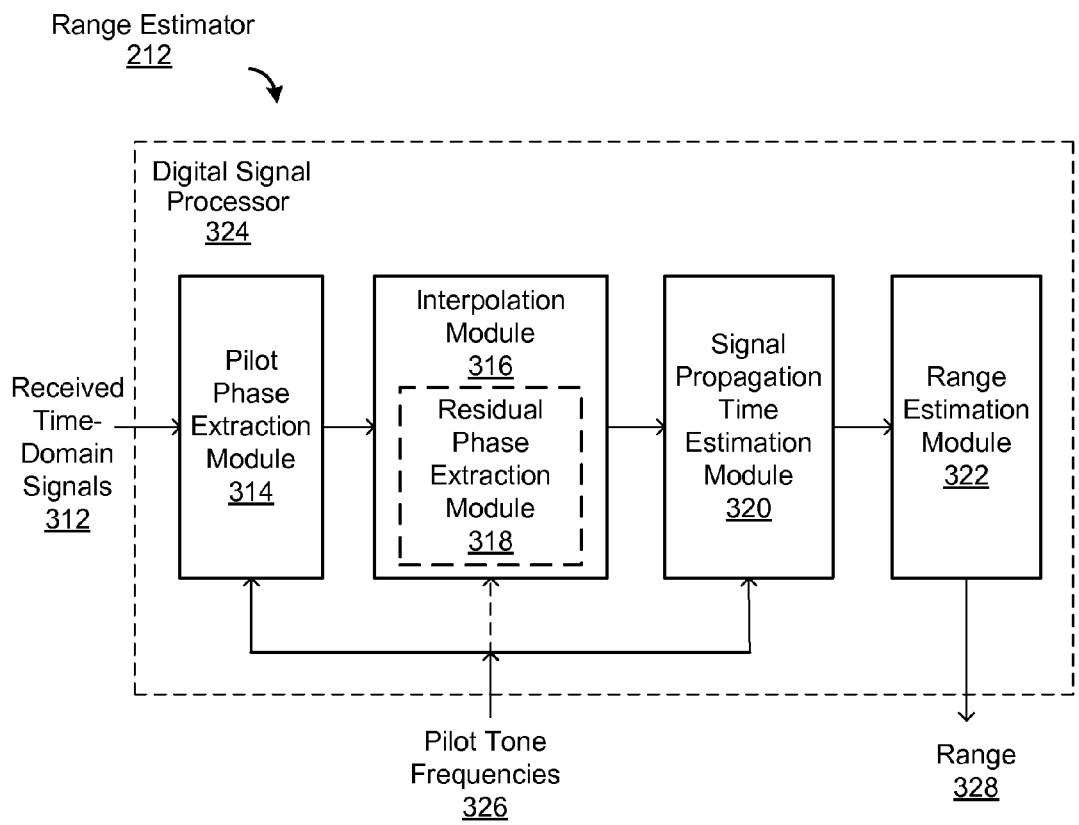

FIG. 3B includes a block diagram illustrating a Range Estimator 212, in accordance with some embodiments. Range Estimator 212 processes the received time-domain signals at Signal Receiver 120 (e.g., OFDM signals received at Signal Receiver 120 from Transmit Location(s)/Tower(s) 130) to compute a range (e.g., Range 328) between the transmit location (e.g., Transmit Location(s)/Tower(s) 130) and the signal receiver (e.g., Signal Receiver 120). Accordingly, in some implementations, Range Estimator 212 includes Pilot Phase Extraction Module 314, Interpolation Module 316, Signal Propagation Time Estimation Module 320, and Range Estimation Module 322.

Pilot Phase Extraction Module 314 extracts from the received time-domain signals (e.g., OFDM signals received at Signal Receiver 120 from Transmit Location(s)/Tower(s) 130; Received time-domain signal 502, FIG. 5A) pilot phase values (e.g., phases of pilot tones present in the received time-domain signals) corresponding to a plurality of pilot tones at a plurality of corresponding frequencies (also referred to herein as 'pilot tone frequencies'). In some embodiments, Range Estimator 212 generates, obtains, or otherwise provides a representation of the plurality of frequencies corresponding to the plurality of pilot tones (or, pilot tone frequencies). Accordingly, Pilot Phase Extraction Module 314 obtains the plurality of frequencies corresponding to the plurality of pilot tones. For example, as shown in FIG. 3B, Pilot Phase Extraction Module 314 obtains Pilot Tone Frequencies 326 (e.g., from Digital Processor 214, FIG. 2, and/or by referencing a locally-stored or remotely-located almanac and/or by referencing OFDM pilot tone frequencies defined by LTE specifications).

In some embodiments, Pilot Phase Extraction Module 314 extracts pilot phase values corresponding to a plurality of pilot tones by performing a time-to-frequency domain transformation (e.g., a Fourier transform) on a set of samples generated from sampling the received time-domain signal (e.g., OFDM signal received at Signal Receiver 120 from Transmit Location(s)/Tower(s) 130), as explained in further detail with reference to FIG. 3C and with respect to operations 608-614 (Method 600, FIG. 6A).

In alternative embodiments, Pilot Phase Extraction Module 314 extracts pilot phase values (or a representation thereof) corresponding to a plurality of pilot tones by processing the received time-domain signal (e.g., OFDM signal received at Signal Receiver 120 from Transmit Location(s)/Tower(s) 130) with a parallel set of signal correlators, as explained in further detail with reference to FIG. 3D and with respect to operation 616 (Method 600, FIG. 6A).

Interpolation Module 316 obtains extracted pilot phase values (e.g., phases of pilot tones present in the received time-domain signals) from Pilot Phase Extraction Module 314. Interpolation Module 316 optionally computes residual pilot phase values (e.g., Pilot Phase Values, FIG. 5A). To that end, in some embodiments, Interpolation Module 316 includes Residual Phase Extraction Module 318 to compute residual pilot phase values. Residual Phase Extraction Module 318 optionally computes residual phase values corresponding to the extracted pilot phase values (e.g., phases of pilot tones present in the received time-domain signals) by subtracting from the extracted pilot phase values a representation of the pilot phase values at the transmit location (e.g., Transmit Location(s)/Tower(s) 130) at the instance of signal transmission, as explained mathematically below:

$$\phi(Y_k) = \phi(X_k) + 2\pi k \cdot \Delta f \cdot t_d + \theta_\epsilon$$

where:
- $\Phi(\cdot)$ is the phase of the pilot tone at the transmit location ($X_k$) or receive location ($Y_k$)
- k is the subcarrier index;
- $\Delta f$ is the subcarrier spacing;
- $t_d$ is the propagation delay; and
- $\theta_\epsilon$ is the phase difference between the transmit and receive references In such embodiments, residual phase values $\Phi = (Y_k) - \phi(X_k) = 2\pi k \cdot \Delta f \cdot t_d + \theta_\epsilon$ Interpolation Module 316 subsequently fits an interpolation function to residual pilot phase values (e.g., Interpolation function fitted to pilot phase values 506, FIG. 5A), corresponding to the extracted pilot phase values. In some embodiments, Interpolation Module 316 fits an interpolation function to the extracted pilot phase values (e.g., phases of pilot tones present in the received time-domain signals and extracted by Pilot Phase Extraction Module 314).

In some embodiments, Interpolation Module 316 fits an interpolation function to residual pilot phase values, corresponding to the extracted pilot phase values using interpolation methods (e.g., curve-fitting, polynomial interpolation, spline interpolation, Gaussian interpolation, regression-based methods, etc.).

Figure 5A:
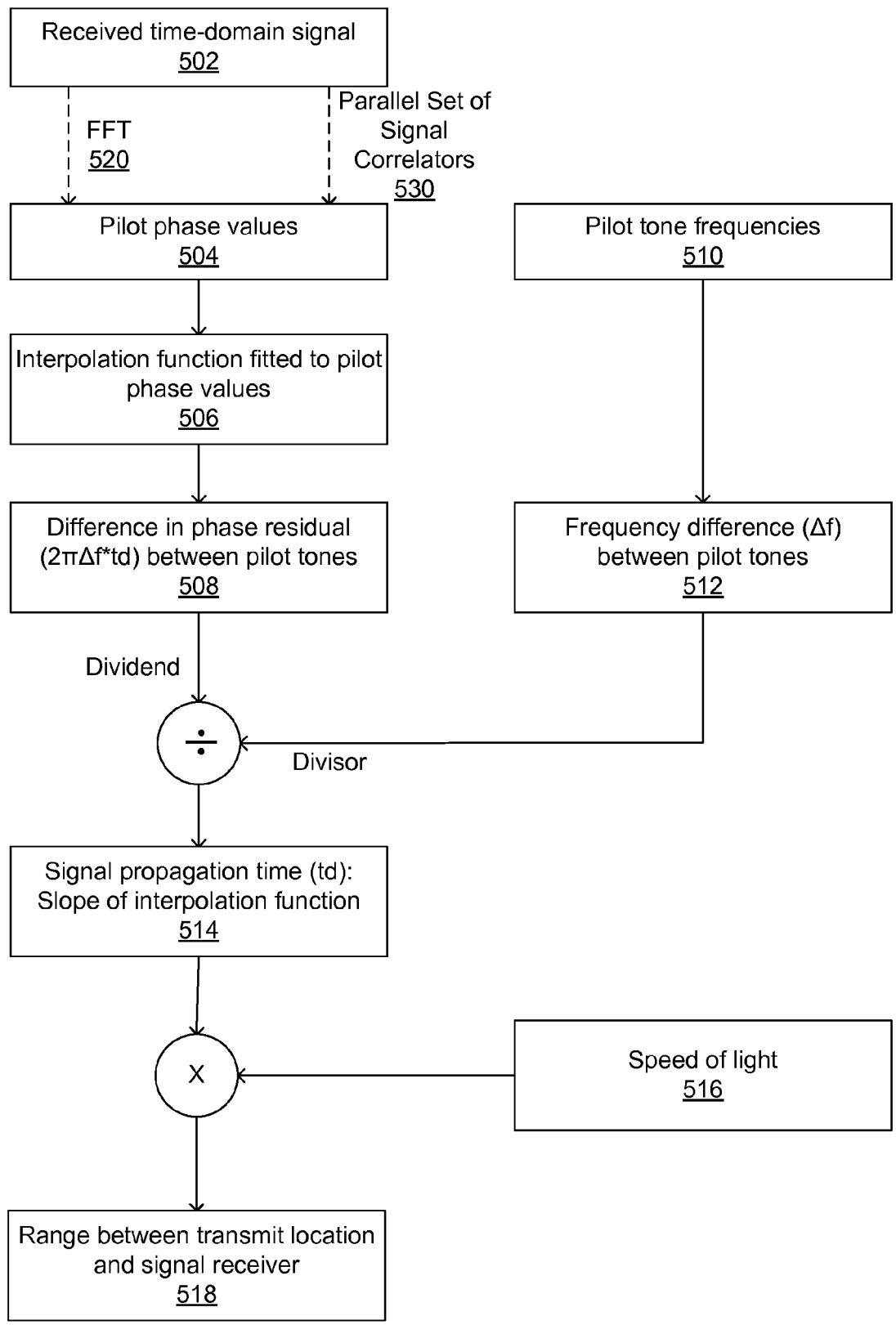
FIGS. 5A-5B include flow diagrams illustrating estimation of range to a transmit location and speed of the signal receiver, in accordance with some embodiments.

In some implementations, Interpolation Module 316 obtains a representation of the plurality of frequencies corresponding to the plurality of pilot tones (e.g., Pilot tone frequencies 510, FIG. 5A). For example, as shown in FIG. 3B, Pilot Phase Extraction Module 314 obtains Pilot Tone Frequencies 326 corresponding to the plurality of pilot tones in Received Time-Domain Signals 312. In some implementations, Interpolation Module 316 obtains Pilot Tone Frequencies 326 by referencing an almanac (e.g., stored locally on Signal Receiver 120, or stored remote to and separate from Signal Receiver 120) and/or from referencing OFDM pilot tone frequencies defined by LTE specifications. In some embodiments, Digital Processor 214 (e.g., Microprocessor 218, FIG. 1) generates, obtains, or otherwise provides a representation of the plurality of frequencies (e.g., Pilot Tone Frequencies 326) corresponding to the plurality of pilot tones. In such embodiments, Interpolation Module 316 obtains a representation of the plurality of frequencies (e.g., Pilot Tone Frequencies 326) corresponding to the plurality of pilot tones from Digital Processor 214 (e.g., Microprocessor 218, FIG. 1).

Signal Propagation Time Estimation Module 320 obtains from Interpolation Module 316 an interpolation function fitted to residual pilot phase values (e.g., Interpolation function fitted to pilot phase values 506, FIG. 5A). Signal Propagation Time Estimation Module 320 subsequently determines a slope of the interpolation function. In some embodiments, Signal Propagation Time Estimation Module 320 determines the slope, td, of the interpolation function based on a difference in residual phase (or, equivalently, the difference in measured phase at the receiver), $2\pi\Delta f^* td$, (e.g., Difference in residual phase ($2\pi\Delta f^* td$) between pilot tones 508, FIG. 5A) between two pilot tones having a frequency difference of $\Delta f$ (e.g., Frequency difference ($\Delta f$) between pilot tones 512, FIG. 5A). In some implementations, the phase of the pilots tones at the transmitter is the same for all pilot tones, and therefore the determination of the slope, td, can be determined by differencing the measured phase of two pilot tones having a frequency difference of $\Delta f$, without having explicit knowledge of the pilot tone phases at the transmitter (and thus without explicitly computing the residual phases). Stated another way, in such implementations, the measured pilot tone phases are equal to the residual pilot tone phases.

In some embodiments, Signal Propagation Time Estimation Module 320 obtains a representation of at least a subset of the plurality of frequencies corresponding to the plurality of pilot tones (e.g., from Digital Processor 214 FIG. 2, from a local or remote almanac and/or from referencing OFDM pilot tone frequencies from LTE specifications). For example, as shown in FIG. 3B, Pilot Phase Extraction Module 314 obtains Pilot Tone Frequencies 326 (or a subset thereof) for the plurality of pilot tones, corresponding to which a difference in residual phase is computed (e.g., Difference in residual phase ($2\pi\Delta f^* td$) between pilot tones 508, FIG. 5A). For example, Signal Propagation Time Estimation Module 320 obtains a representation of two frequencies, having a frequency difference of $\Delta f$, of two pilot tones, and computes the difference in residual phase, $2\pi\Delta f^* td$. Alternatively, or in addition, Signal Propagation Time Estimation Module 320 obtains, generates, or otherwise provides the frequency difference, $\Delta f$, between the two frequencies corresponding to the two pilot tones, corresponding to which the difference in residual phase, $2\pi\Delta f^* td$, is computed. As such, Signal Propagation Time Estimation Module 320 computes a signal propagation time or slope of the interpolated function (e.g., Signal propagation time (td) or Slope of interpolation function 514, FIG. 5A).

Range Estimation Module 322 obtains a signal propagation time (e.g., Signal propagation time (td) or Slope of interpolation function 514, FIG. 5A) from Signal Propagation Time Estimation Module 320. Range Estimation Module 322 computes a range (e.g., Range 328; or Range between transmit location and signal receiver 518, FIG. 5A) between the transmit location (e.g., Transmit Location(s)/Tower(s) 130) and the signal receiver (e.g., Signal Receiver 120) by multiplying the computed signal propagation time with the speed of light (e.g., Speed of light 516, FIG. 5A).

Figure 3C:
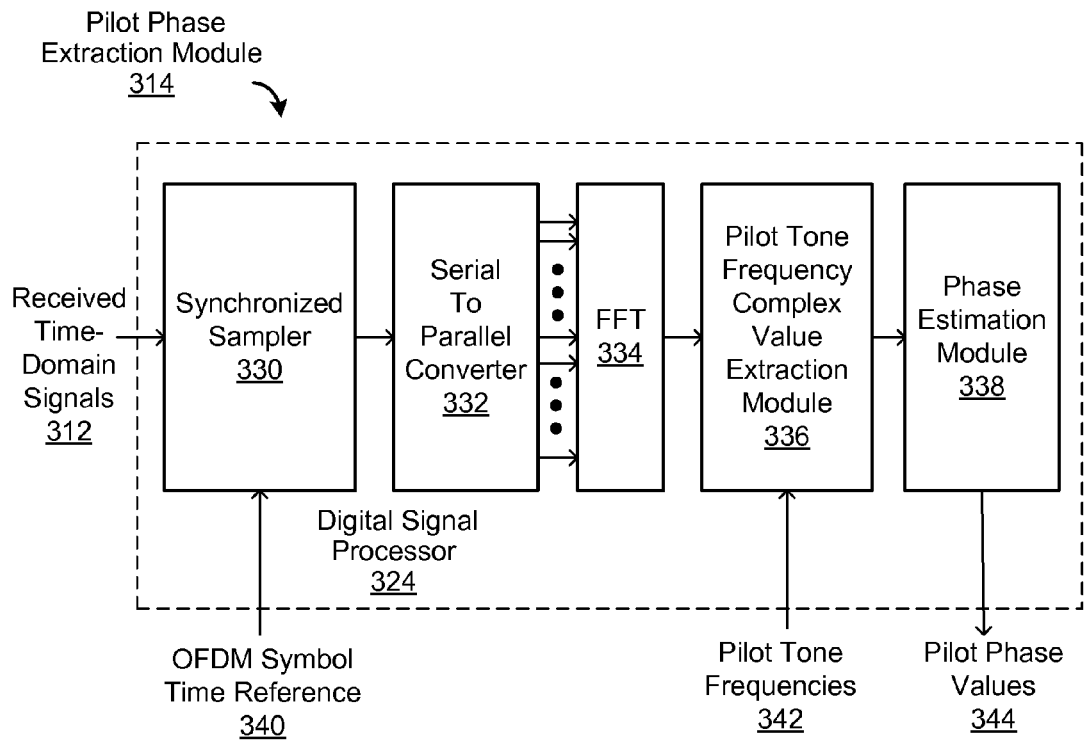

FIG. 3C includes a block diagram illustrating a Pilot Phase Extraction Module 314, in accordance with some embodiments. As shown in FIG. 3C, Pilot Phase Extraction Module 314 extracts pilot phase values (e.g., Pilot Phase Values 344) corresponding to a plurality of pilot tones by performing a time-to-frequency domain transformation (e.g., a Fourier transform) on a set of samples generated from sampling received time-domain signals (e.g., Received Time-Domain Signals 312, such as OFDM signals received at Signal Receiver 120 from Transmit Location(s)/Tower(s) 130).

In some implementations, as shown in FIG. 3C, Pilot Phase Extraction Module 314 includes Synchronized Sampler 330, Serial-to-Parallel Converter 332, fast Fourier transform module (FFT) 334, Pilot Tone Frequency Complex Value Extraction Module 336, and Phase Estimation Module 338. Synchronized Sampler 330 samples the received time-domain signals (e.g., Received Time-Domain Signals 312) to generate a set of samples. In some embodiments, when Received Time-Domain Signals 312 correspond to OFDM signals obtained from one or more OFDM transmit locations, Synchronized Sampler 330 samples Received Time-Domain Signals 312 for a period of the OFDM symbols. In such embodiments, Synchronized Sampler 330 samples Received Time-Domain Signals 312 beginning at a start instance and for a duration specified by a timing reference (e.g., OFDM Symbol Time Reference 340) indicating an OFDM symbol start time and an OFDM symbol duration, respectively.

Serial-to-Parallel Converter 332 obtains from Synchronized Sampler 330 a serial stream of samples corresponding to Received Time-Domain Signals 312 and converts them into a parallel stream of samples. In some embodiments, the number of parallel samples corresponds to the number of samples on which FFT 334 operates. For example, if FFT 334 performs a 1024-point Fourier transform (e.g., operates on 1024 samples for each Fourier transform operation), then Serial-to-Parallel Converter 332 repeatedly buffers 1024 samples of the serial input obtained from Synchronized Sampler 330 and generates 1024 corresponding parallel samples.

FFT 334 obtains a parallel stream of samples from Serial-to-Parallel Converter 332 and performs a Fourier transform on the set of samples to produce a set of complex value pairs. In some implementations, FFT 334 performs a time-to-frequency domain transformation (e.g., a Fourier transform, using a fast Fourier transform implementation) on the parallel stream of samples obtained from Serial-to-Parallel Converter 332 to generate a set of complex value pairs, each complex value pair corresponding to a frequency bin. Moreover, the complex value pair for each frequency bin includes a real portion and an imaginary portion (alternately referred to herein as the in-phase or 'I' component and the quadrature or 'Q' component, respectively). Furthermore, the complex value pair for each frequency bin has a corresponding magnitude value and phase value. In various embodiments, FFT 334 is implemented in software, hardware (e.g., on an FFT chip), or on a digital signal processor.

Pilot Tone Frequency Complex Value Extraction Module 336 obtains complex value pairs from FFT 334, each complex value pair corresponding to a frequency bin or frequency value (e.g., defined by the Fourier transform performed by FFT 334) in a frequency range that spans at least a subset of the frequency range of the received time-domain signal (e.g., Received Time-Domain Signals 312). Pilot Tone Frequency Complex Value Extraction Module 336 extracts a pair of complex values for each pilot tone in a set of pilot tones that includes at least a subset of the aforementioned plurality of pilot tones. For example, for a frequency range spanning $X_1$ MHz to $X_2$ MHz, if FFT 334 generates complex value pairs at frequency bins or frequency values (e.g., as defined by the Fourier transform performed by FFT 334) corresponding to $F_1, P_1, F_2, P_2, F_3, F_4, F_5, P_6, F_7, P_3, P_4, F_8, F_9, F_{10}, P_5, P_6, F_{11}, F_{12}, P_7$ MHz, and if the plurality of pilot tones occur at designated frequencies $P_1, P_2, P_3, P_4, P_5, P_6$, and $P_7$ MHz (e.g., as defined by LTE specifications or as obtained from an almanac) then Pilot Tone Frequency Complex Value Extraction Module 336 extracts a pair of complex values for each pilot tone in a subset of the pilot tones, e.g., for each of the pilot tones at frequencies $P_3, P_5,$ and $P_6$ MHz. In some implementations, Pilot Tone Frequency Complex Value Extraction Module 336 extracts a pair of complex values for each of the pilot tones at the designated pilot tone frequencies $P_1, P_2, P_3, P_4, P_5, P_6,$ and $P_7$ MHz.

Phase Estimation Module 338 obtains from Pilot Tone Frequency Complex Value Extraction Module 336 a pair of complex values for each pilot tone in a set of pilot tones. Phase Estimation Module 338 then estimates (e.g., computes) phase values from the set of complex value pairs obtained from Pilot Tone Frequency Complex Value Extraction Module 336 to produce pilot phase values (e.g., Pilot Phase Values 344). In some embodiments, the estimated (e.g., computed) pilot phase values are phase values of each of the complex value pairs corresponding to the pilot tones in the set of pilot tones. As explained above, the complex value pair for each frequency bin (e.g., for each pilot tone or each corresponding pilot tone frequency) has a corresponding magnitude value and phase value. The magnitude value ('r') and phase value ('φ') of a complex value pair (e.g., denoted in complex form as z='x+jy') relate to the real portion ('x') and the imaginary portion ('y') of the respective complex value pair as follows:

$$r = |z| = \sqrt{x^2+y^2}\ \sqrt{x^2+y^2}$$

$$\varphi = \arg(z) = \begin{cases} \arctan\left(\frac{y}{x}\right) & \text{if } x > 0 \\ \arctan\left(\frac{y}{x}\right)+\pi & \text{if } x < 0 \text{ and } y \geq 0 \\ \arctan\left(\frac{y}{x}\right)-\pi & \text{if } x < 0 \text{ and } y < 0 \\ \frac{\pi}{2} & \text{if } x = 0 \text{ and } y > 0 \\ -\frac{\pi}{2} & \text{if } x = 0 \text{ and } y < 0 \\ \text{indeterminate} & \text{if } x = 0 \text{ and } y = 0. \end{cases}$$

In some embodiments, if the total phase change (or phase shift) over the frequency span of the received signals (e.g., the received OFDM signals) exceeds $2\pi$ radians, resulting discontinuities (e.g., due to phase-wrapping) in the phase of the received signals are eliminated (e.g., by Phase Estimation Module 338), for example by methods such as "phase unwrapping" (e.g., by the addition or subtraction of integer multiples of $2\pi$ radians).

As such, in some embodiments, Phase Estimation Module 338 estimates (e.g., computes) pilot phase values (e.g., Pilot Phase Values 344) from the set of complex value pairs for the set of pilot tones or pilot tone frequencies as described above.

Figure 3D:
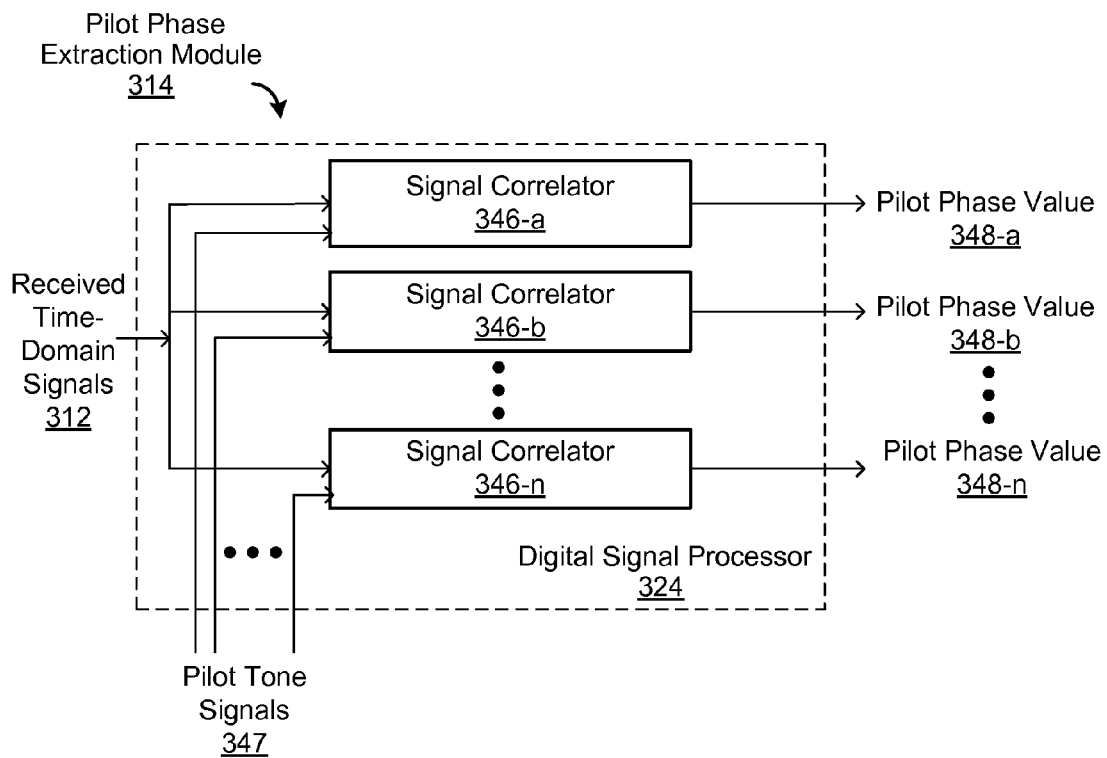

FIG. 3D includes a block diagram illustrating a Pilot Phase Extraction Module 314, in accordance with some embodiments. In some embodiments, Pilot Phase Extraction Module 314 extracts pilot phase values corresponding to a plurality of pilot tones by processing received time-domain signals (e.g., OFDM signals received at Signal Receiver 120 from Transmit Location(s)/Tower(s) 130) with a parallel set of signal correlators, each for correlating the received time-domain signal with a respective pilot tone. For example, as shown in FIG. 3D, Received Time-Domain Signals 312 received at Pilot Phase Extraction Module 314 are processed with a parallel set of signal correlators (e.g., Signal Correlator 346-a, Signal Correlator 346-b, Signal Correlator 346-n, and the like). Each of the signal correlators in the parallel set of signal correlators correlates (e.g., performs a mathematical cross-correlation operation by performing a series of shift, multiply, and add operations) the received signal (e.g., Received Time-Domain Signals 312) with a respective pilot tone (e.g., each of the respective Pilot Tone Signals 347) to extract pilot phase values (e.g., Pilot Phase Values 348-a, Pilot Phase Values 348-b, Pilot Phase Values 348-n, and the like) corresponding to the respective pilot tones. Pilot Tone Signals 347 are typically locally stored or locally generated pilot tone signals, stored or generated within the receiver 120 that incorporated digital signal processor 324. In some embodiments, Pilot Phase Extraction Module 314 extracts a representation of pilot phase values (e.g., a measure of phase lag or time lag between respective pilot tones) rather than a direct measure of the pilot phase values. However, since the range to a respective Transmit Location is determined based on the difference in residual phase between pilot tones transmitted from the same Transmit Location, such pilot phase values (e.g., having a fixed offset) work equally well as the phase values obtained using other embodiments described herein.

Figure 4:
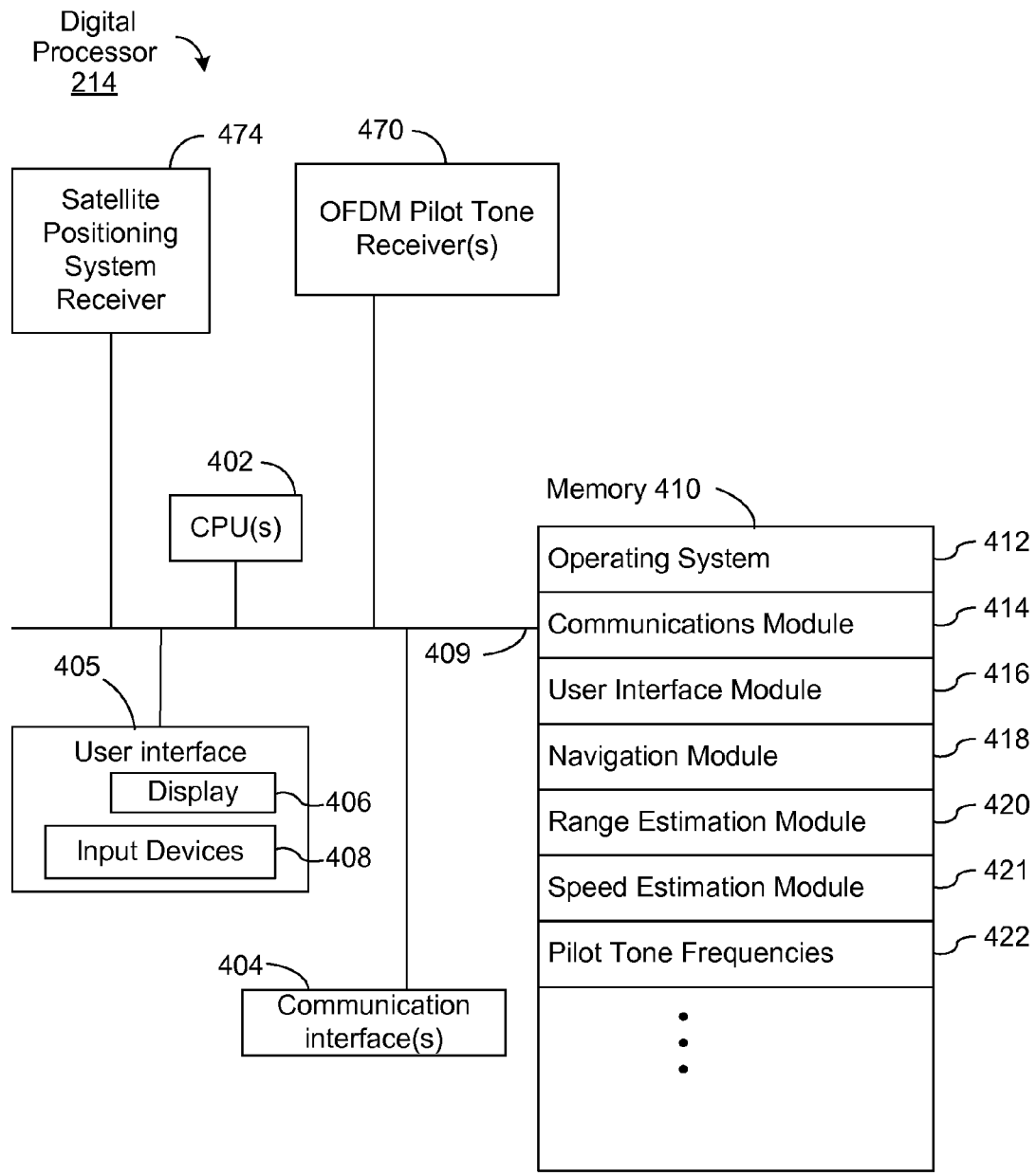
FIG. 4 is a block diagram illustrating a digital processor in the signal receiver configured for estimation of range to a transmit location and speed of the signal receiver, in accordance with some embodiments.

FIG. 4 is a block diagram illustrating Digital Processor 214 in accordance with one embodiment of the present invention. The Digital Processor 214 typically includes one or more processing units (CPU's) 402 for executing modules, programs and/or instructions stored in Memory 410 and thereby performing processing operations; one or more network or other Communications Interfaces 404; Memory 410; and one or more Communication Buses 409 for interconnecting these components. The Communication Buses 409 optionally include circuitry (sometimes called a chipset) that interconnects and controls communications between system components. The Digital Processor 214 optionally includes a User Interface 405 comprising a Display Device 406 and Input Devices 408. Memory 410 includes high-speed random access memory, such as DRAM, SRAM, DDR RAM or other random access solid state memory devices; and optionally, but typically, includes non-volatile memory, such as one or more magnetic disk storage devices, optical disk storage devices, flash memory devices, or other non-volatile solid state storage devices. Memory 410 optionally includes one or more storage devices remotely located from the CPU(s) 402. Memory 410, or alternately the non-volatile memory device(s) within Memory 410, comprises a non-transitory computer readable storage medium. In some embodiments, Memory 410, or the computer readable storage medium of Memory 410 stores the following programs, modules and data structures, or a subset thereof:

- Operating System 412 that includes procedures for handling various basic system services and for performing hardware dependent tasks;
- Network Communication Module 414 that is used for connecting the Digital Processor 214 to other computers via the one or more communication network interfaces 404 (wired or wireless) and one or more communication networks, such as the Internet, other wide area networks, local area networks, metropolitan area networks, and so on;
- User Interface Module 416 that receives commands from the user via one or more Input Devices 408 of User Interface 405, generates user interface objects in Display Device 406, and/or displays maps, coordinates, routes, etc., related to the position of Signal Receiver 120;
- Navigation Module 418 that produces navigation results (e.g., a range to satellite, ranges to multiple satellites, geographic positioning, location information, and/or a time value) by processing digitized satellite signals received from Satellite Positioning System Receiver 474 and/or by processing digitized OFDM signals received from OFDM Pilot Tone Receiver(s) 470;
- Range Estimation Module 420 that computes a range between a respective transmit location (e.g., Transmit Location(s)/Tower(s) 130) and Signal Receiver 120 by computing a signal propagation time of the received time-domain signal from extracted pilot phase values (e.g., as described in further detail in relation to Method 600, operations 620-624) and by subsequently multiplying the computed signal propagation time with the speed of light;
- Speed Estimation Module 421 that computes a speed of Signal Receiver 120 (e.g., as described in further detail in relation to Method 600, operations 628-636) by computing a set of ranges and a corresponding set of range change rates, and by subsequently combining the set of range change rates; and
- Pilot Tone Frequencies 422 that include multiple sets of pilot tone frequencies (e.g., corresponding to OFDM pilot tone frequencies defined by LTE specifications), optionally obtained by referencing an almanac.

Each of the above identified elements may be stored in one or more of the previously mentioned memory devices, and each of the modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 410 stores a subset of the modules and data structures identified above. Furthermore, Memory 410 optionally stores additional modules and data structures not described above.

Although FIG. 4 shows a "Digital Processor," FIG. 4 is intended more as functional description of the various features which may be present in a set of digital processors than as a structural schematic of the embodiments described herein. In practice, and as recognized by those of ordinary skill in the art, items shown separately could be combined and some items could be separated. For example, some items shown separately in FIG. 4 could be implemented on single processors and single items could be implemented by one or more processors. The actual number of processors used to implement Digital Processor 214 and how features are allocated among them will vary from one implementation to another, and may depend in part on the amount of data traffic that the system must handle during peak usage periods as well as during average usage periods.

FIG. 5A is a flow diagram illustrating range estimation at a signal receiver (e.g., Signal Receiver 120), according to some embodiments. As explained above with reference to FIG. 2 and FIGS. 3B-3D, Received time-domain signal 502 (e.g., Received Time-Domain Signals 312, FIGS. 3B-3D) are received at the signal receiver (e.g., Signal Receiver 120, FIG. 2) and processed as shown in FIG. 5A to produce a Range 518 between a respective transmit location and the signal receiver (e.g., Range 328, FIG. 3B).

Accordingly, as shown in FIG. 5A, Pilot phase values 504 (e.g., Pilot Phase Values 344) are extracted from Received time-domain signal 502. In some embodiments, as explained with reference to FIG. 3C, Pilot phase values 504 (e.g., Pilot Phase Values 344, FIG. 3C) corresponding to a plurality of pilot tones are extracted from Received time-domain signal 502 (e.g., Received Time-Domain Signals 312) by performing a time-to-frequency domain transformation (e.g., a Fourier transform, FFT 520) on a set of samples generated from sampling Received time-domain signal 502.

In alternative embodiments, as explained with reference to FIG. 3D, Pilot phase values 504 (e.g., Pilot Phase Values 344, FIG. 3C) are extracted from Received time-domain signal 502 (e.g., Received Time-Domain Signals 312) by processing received time-domain signals (e.g., OFDM signals received at Signal Receiver 120 from Transmit Location(s)/Tower(s) 130) with a parallel set of signal correlators (e.g., Parallel Set of Signal Correlators 530), each for correlating the received time-domain signal with a respective pilot tone.

Signal Receiver 120 subsequently obtains an Interpolation function fitted to pilot phase values 506 (as explained with reference to Interpolation Module 316, FIG. 3B) and computes a Difference in residual phase ($2\pi\Delta f^* td$) between pilot tones 508 (as explained with reference to FIG. 3B). Signal Receiver 120 also obtains Pilot tone frequencies 510 (e.g., Pilot Tone Frequencies 326), for example from an almanac and/or by referencing OFDM pilot tone frequencies defined by LTE specifications, and computes Frequency difference ($\Delta f$) between pilot tones 512.

Signal Receiver 120 divides the computed Difference in residual phase ($2\pi\Delta f^*td$) between pilot tones 508 (as dividend) by the Frequency difference ($\Delta f$) between pilot tones 512 (as divisor) and by a factor of $2\pi$ to obtain the Signal propagation time (td) or Slope of interpolation function 514 (e.g., as explained above with reference to Signal Propagation Time Estimation Module 320, FIG. 3B).

Signal Receiver 120 (e.g., Range Estimation Module 322, FIG. 3B) then obtains Range between transmit location and signal receiver 518 (e.g., Range 328, FIG. 3B) by multiplying Signal propagation time (td) 514 by the Speed of light 516.

Figure 5B:
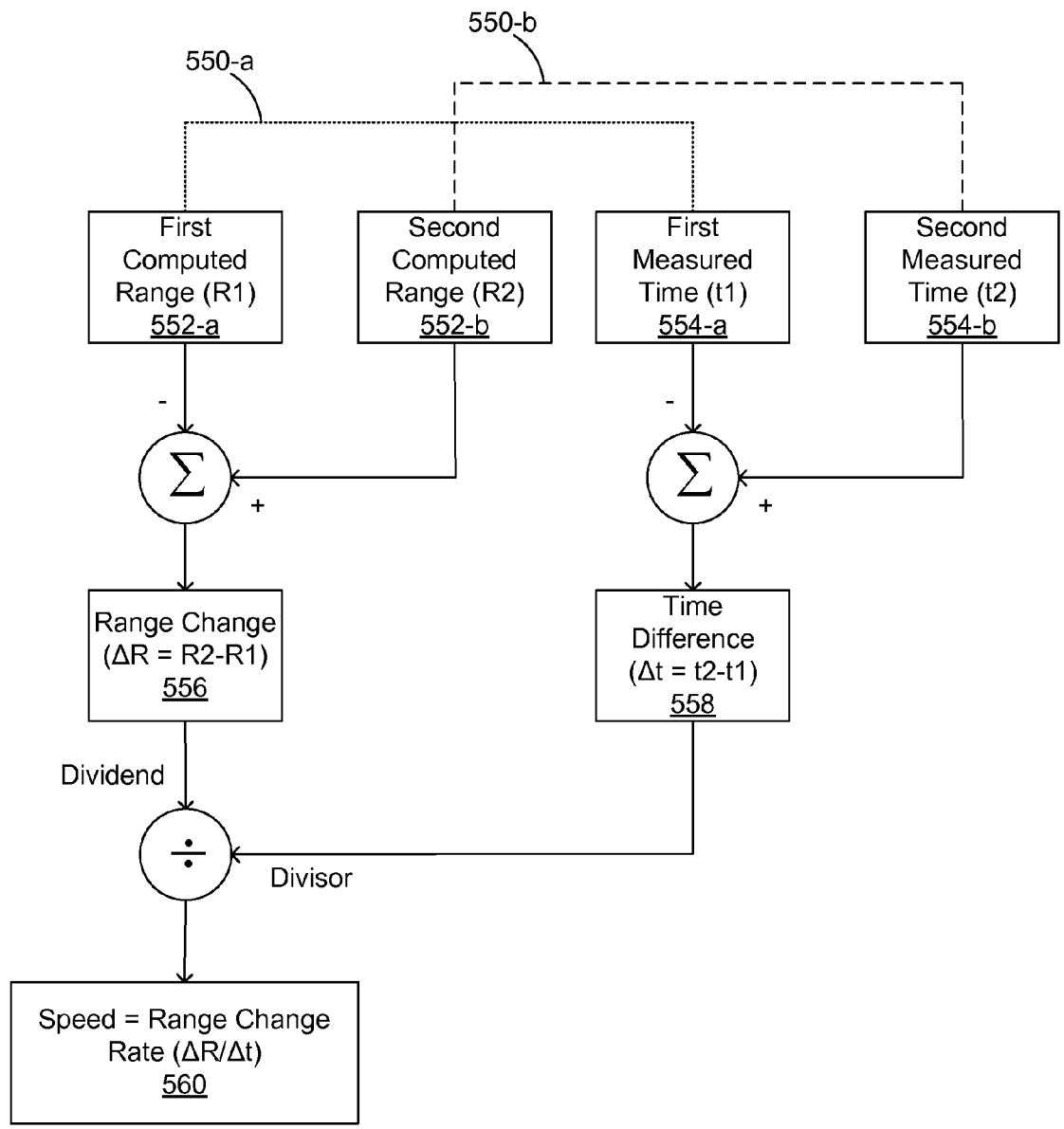

FIG. 5B is a flow diagram illustrating speed estimation at a signal receiver (e.g., Signal Receiver 120), according to some embodiments. Signal Receiver 120 computes a first set of ranges, including First Computed Range (R1) 552-a, using signals received (e.g., Received Time-Domain Signals 312, FIGS. 3B-3D) from a set of transmit locations (e.g., Transmit Location(s)/Location(s) 130) at a corresponding (550-a) First Measured Time (t1) 554-a. Signal Receiver 120 computes a second set of ranges, including Second Computed Range (R2) 552-b, using signals received (e.g., Received Time-Domain Signals 312, FIGS. 3B-3D) from a set of transmit locations (e.g., Transmit Location(s)/Location(s) 130) at a corresponding (550-a) Second Measured Time (t2) 554-b.

Signal Receiver 120 computes Range Change ($\Delta R=R2-R1$) 556 by subtracting First Computed Range (R1) 552-a from Second Computed Range (R2) 552-b. Signal Receiver 120 computes a difference between the second time (e.g., Second Measured Time (t2) 554-b) and the first time (e.g., First Measured Time (t1) 554-a) as Time Difference ($\Delta t=t2-t1$) 558. Signal Receiver 120 then computes a speed as Range Change Rate ($\Delta R/\Delta t$) 560 by dividing Range Change 556 (as dividend) by Time Difference 558 (as divisor).

In some embodiments, a plurality of ranges are computed using signals received from a plurality of distinct transmit locations. Signal Receiver 120 combines the plurality of ranges to obtain an estimate of the instantaneous position of Signal Receiver 120 (e.g., a position of Signal Receiver 120 as co-ordinates in a two-dimensional plane or a three-dimensional space). In such embodiments, a plurality of corresponding range spheres are optionally computed, each range sphere corresponding to a respective transmit location (defining the center of the respective sphere) and a range to the corresponding transmit location (defining the radius of the respective sphere). Signal Receiver 120 then computes (e.g., by triangulation) one or more points of intersection of the plurality of range spheres as candidate positions of Signal Receiver 120. Signal Receiver 120 optionally resolves a single position corresponding to a valid candidate position of Signal Receiver 120 by using additional information (e.g., elevation, one or more GNSS ranges and the like).

In some embodiments, Signal Receiver 120 computes a plurality of range changes (e.g., to the same transmit location at different time instances or to different transmit locations). In such embodiments, Signal Receiver 120 computes a vector velocity (e.g., corresponding to the velocity of motion of Signal Receiver 120) based on the magnitudes and directions of two or more of the plurality of range changes. In some embodiments, Signal Receiver 120 performs a plurality of range change measurements after perturbing its position a plurality of times so as to obtain distinct range change measures with respect to a single transmit location. In some implementations, Signal Receiver 120 combines the plurality of range changes to obtain a vector velocity measurement. For example, if the two or more ranges lie in a single plane, Signal Receiver 120 computes a two-dimensional velocity vector in the same plane as the two or more coplanar range changes by combining the magnitudes and directions of the coplanar range change measures. On the other hand, if the Signal Receiver 120 computes three or more non-coplanar range changes corresponding to three or more distinct transmitters, or three or more distinct measurement positions of Signal Receiver 120, then Signal Receiver 120 computes a three-dimensional velocity vector by combining the magnitudes and directions of the three or more non-coplanar range change measures.

Figure 6A:
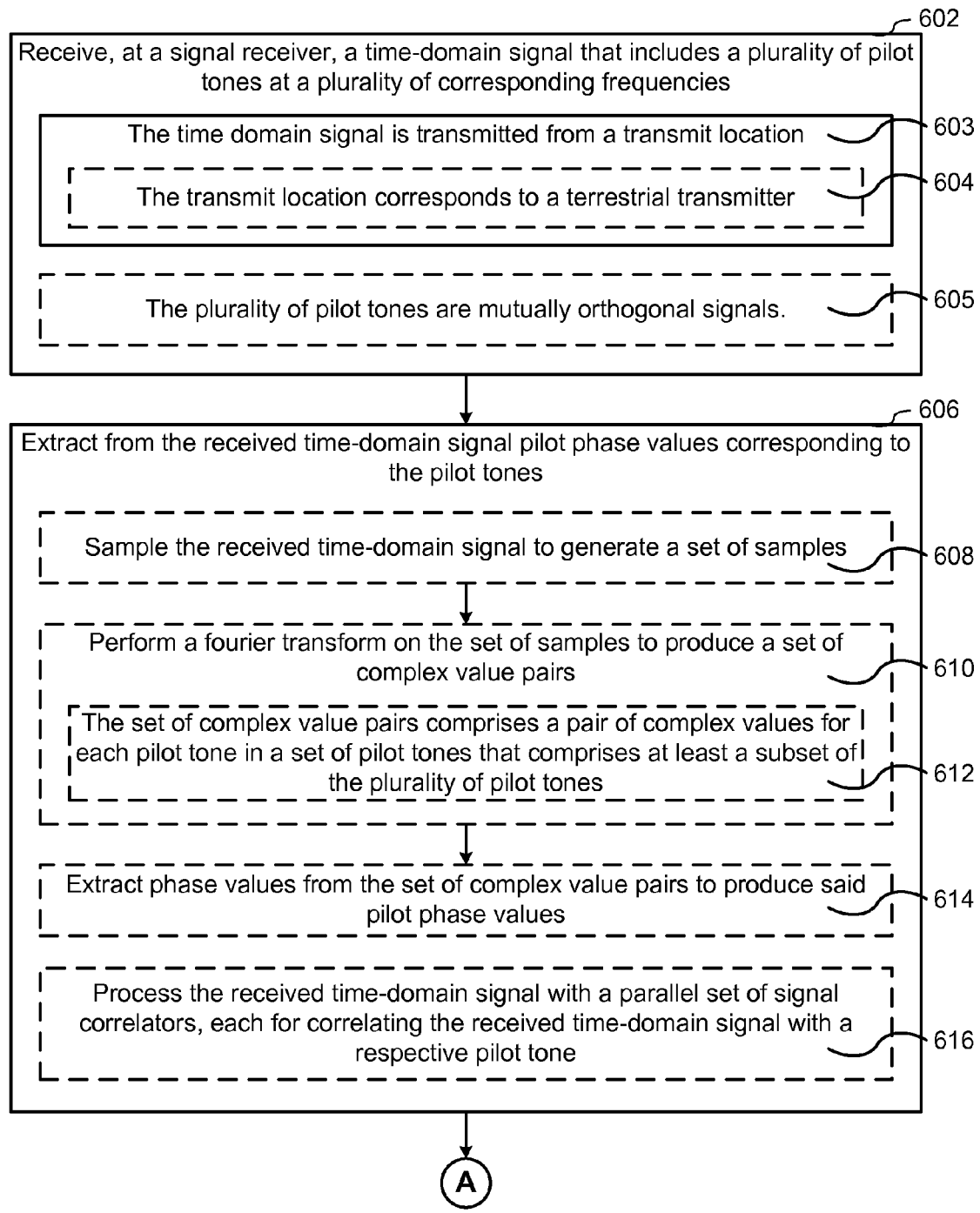
FIGS. 6A-6B include a flow chart illustrating a method of navigation based on an estimation of range to a transmit location and a speed of the signal receiver, in accordance with some embodiments.
Figure 6B:
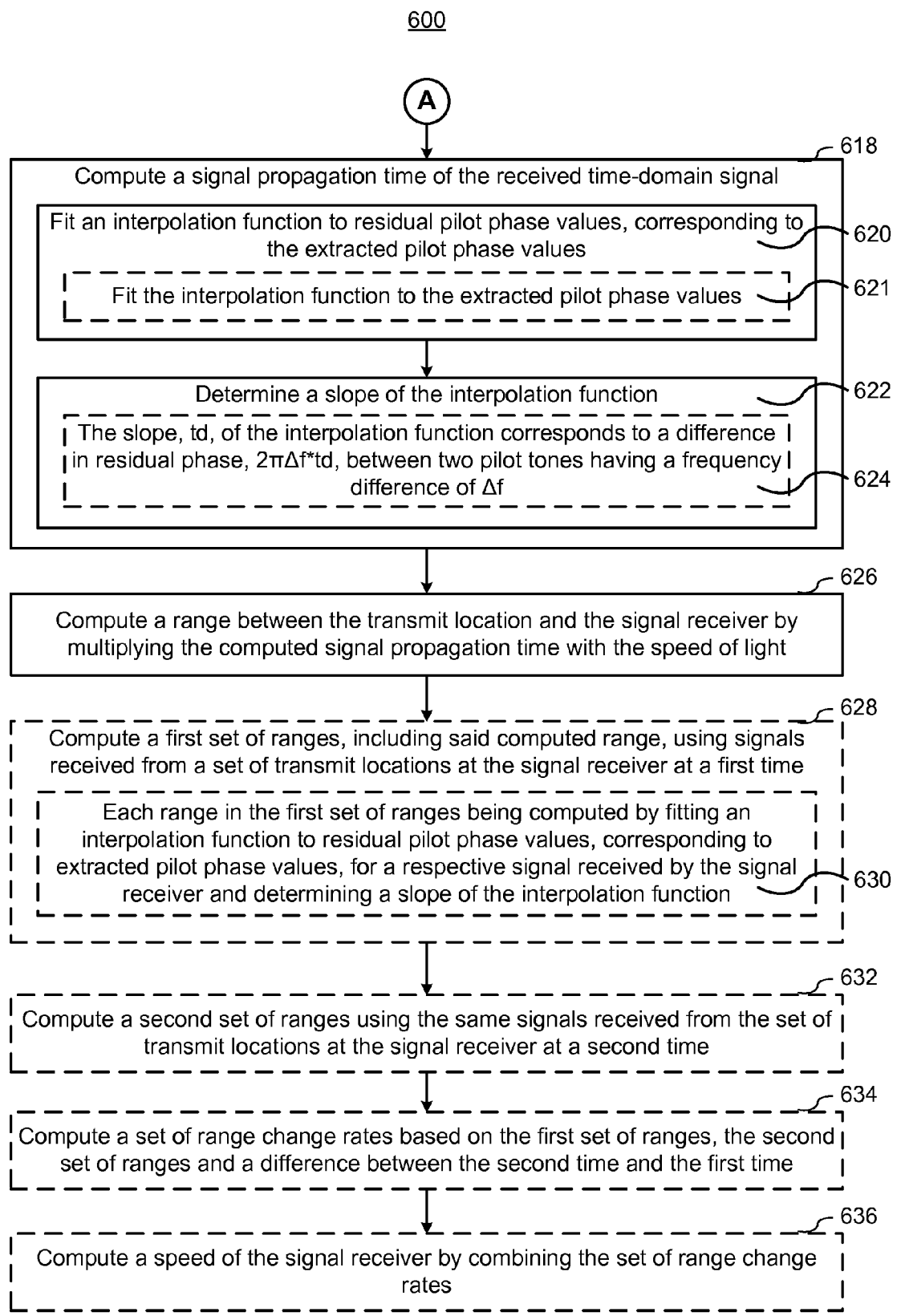

FIGS. 6A-6B illustrate a flowchart representing a method 600 for computing a range to a signal receiver, according to certain embodiments of the invention. Method 600 may be governed by instructions that are stored in a computer readable storage medium (e.g., memory 410 of digital processor 214, FIG. 4) and that are executed by one or more processors (e.g., CPU(s) 402, FIG. 4) of one or more signal receivers (e.g., signal receivers 120, FIG. 2). Each of the operations shown in FIGS. 6A-6B may correspond to instructions stored in a computer memory or computer readable storage medium (e.g., memory 410 of digital processor 214, FIG. 4). The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

The signal receiver receives (602) a time-domain signal that includes a plurality of pilot tones at a plurality of corresponding frequencies. The time-domain signal is transmitted (603) from a transmit location. For example, Signal Receiver 120 (FIG. 1) receives a time-domain signal (e.g., Received Time-Domain Signals 312, FIGS. 3B-3D; Received time-domain signal 502, FIG. 5A) that includes a plurality of pilot tones at a plurality of corresponding frequencies (e.g., Pilot Tone Frequencies 326, FIG. 3B). In some embodiments, the transmit location corresponds to (604) a terrestrial transmitter. For example, Received Time-Domain Signals 312 are transmitted from a transmit location (e.g., Transmit Location(s)/Tower(s) 130). In some implementations, the transmit location corresponds to an OFDM transmitter (e.g., a transmitter that transmits OFDM—Orthogonal Frequency Division Multiplexed—signals).

In some embodiments, the plurality of pilot tones are (605) mutually orthogonal signals. In such embodiments, at a frequency value corresponding to maximum spectral value (e.g., peak power) of a respective pilot tone (corresponding to a respective pilot tone frequency), the spectral value (e.g., the power) of each of the other pilot tones in the plurality of pilot tones is negligible (e.g., each of the other pilot tones in the plurality of pilot tones has zero power if the frequency synthesizer at the receiver accurately locks onto one of the known pilot tones). More generally, orthogonality of the pilot tones is defined as follows:

$$\text{for tones } x_k = a_k e^{\frac{jk2\pi t}{T}} \text{ for } k = 1 \ldots K;$$

where $$\frac{1}{T}$$

is the frequency spacing and K is the number of tones, these tones are orthogonal if, for all integers k=1 ... K, m=1 ... K, and n:

$$\frac{1}{nT}\int_0^{nT} x_k x_m^* \, dt = 0, \text{ for } k \neq m,$$

$$= a_k^2, \text{ for } k = m.$$

where $x_m^*$ is complex conjugate $(x_m)$

Further, as an example, if the OFDM tones (also referred to herein as sub-carriers) correspond to OFDM signal frequencies $F_1, P_1, F_2, P_2, F_3, F_4, F_5, F_6, F_7, P_3, P_4, F_8, F_9, F_{10}, P_5, P_6, F_{11}, F_{12}, P_7$ MHz, the plurality of pilot tones occur at designated frequencies forming a subset of the frequencies of the OFDM tones (also referred to herein as sub-carriers) which are defined, for example, by LTE (Long Term Evolution) specifications. In this example, the plurality of pilot tones occur at designated frequencies $P_1, P_2, P_3, P_4, P_5, P_6$, and $P_7$ MHz. Further, in such embodiments, the duration (or symbol period) of the OFDM time-domain signal is equal to, or an integral multiple of, the inverse of the frequency spacing (e.g., sub-carrier frequency spacing) between the consecutive, orthogonal sub-carrier or OFDM tone frequencies (of which the pilot tone frequencies form a subset).

The signal receiver extracts (606) from the received time-domain signal pilot phase values corresponding to the pilot tones. For example, as explained above with reference to FIG. 3B, Signal Receiver (e.g., Pilot Phase Extraction Module 314) extracts from the received time-domain signal (Received Time-Domain Signals 312) pilot phase values (e.g., Pilot Phase Values 344, FIG. 3C; Pilot Phase Value(s) 348, FIG. 3D) corresponding to the pilot tones.

In some embodiments, extracting from the received time-domain signal pilot phase values corresponding to the pilot tones includes operations 608-614. In these embodiments, the signal receiver samples (608) the received time-domain signal to generate a set of samples. In some implementations, the signal receiver samples the received time-domain signal synchronized to the OFDM symbol period. For example, as shown in FIG. 3C, Synchronized Sampler 330 samples Received Time-domain Signals 312 synchronized to the OFDM symbol period as indicated by OFDM Symbol Time Reference 340, to generate a set of samples. In some implementations, the signal receiver performs (610) a Fourier transform on the set of samples to produce a set of complex value pairs. For example, FFT 334 (FIG. 3C) performs a time-to-frequency domain transform (e.g., a Fourier transform) on the set of samples to produce a set of complex value pairs.

In some implementations, the set of complex value pairs comprises (612) a pair of complex values for each pilot tone in a set of pilot tones that comprises at least a subset of the plurality of pilot tones. For example, as described above with reference to FIG. 3C, if FFT 334 generates complex value pairs at frequency bins or frequency values (e.g., as defined by the Fourier transform performed by FFT 334) corresponding to frequencies $F_1, P_1, F_2, P_2, F_3, F_4, F_5, F_6, F_7, P_3, P_4, F_8, F_9, F_{10}, P_5, P_6, F_{11}, F_{12}, P_7$ MHz, and if the plurality of pilot tones occur at designated frequencies $P_1, P_2, P_3, P_4, P_5, P_6$, and $P_7$ MHz (e.g., as defined by LTE specifications or as obtained from an almanac), then Pilot Tone Frequency Complex Value Extraction Module 336 (FIG. 3C) extracts a pair of complex values for each of pilot tones in a subset of the pilot tones, e.g., for each of the pilot tones at frequencies $P_3, P_5$, and $P_6$ MHz.

In some implementations, Pilot Tone Frequency Complex Value Extraction Module 336 extracts a pair of complex values for each of the pilot tones (e.g., at frequencies $P_1, P_2, P_3, P_4, P_5, P_6$, and $P_7$ MHz).

In some embodiments, the signal receiver extracts (614) phase values from the set of complex value pairs to produce said pilot phase values. For example, as explained with reference to FIG. 3C above, Phase Estimation Module 338 estimates (e.g., computes) pilot phase values (e.g., Pilot Phase Values 344) from the set of complex value pairs for each pilot tone or pilot tone frequency as described mathematically above with reference to FIG. 3C.

In some implementations, when Received Time-Domain Signals 312 correspond to OFDM signals, Signal Receiver 120 (e.g., Synchronized Sampler 330) samples the Received Time-Domain Signals 312 for the period of the OFDM symbols (e.g., at a 15 KHz symbol rate as defined by LTE specifications). In some embodiments, the received OFDM signal includes more than one hundred (e.g., 900) distinct pilot and data tones. Signal Receiver 120 (e.g., Synchronized Sampler 330) obtains 1024 samples per OFDM symbol and subsequently, FFT 334 performs a 1024 point Fourier transform to obtain a set of 1024 complex value pairs. In some embodiments, distinct transmitters (e.g., Transmit Location(s)/Tower(s) 130-a, Transmit Location(s)/Tower(s) 130-b, and the like) use distinct pilot tone frequencies for the designated pilot tones. In some implementations, the pilot tone frequencies for distinct transmitters (e.g., transmit locations) are defined by LTE specifications.

In alternative embodiments, extracting from the received time-domain signal pilot phase values corresponding to the pilot tones comprises processing (616) the received time-domain signal with a parallel set of signal correlators, each for correlating the received time-domain signal with a respective pilot tone. For example, as explained above with reference to FIG. 3D, Received Time-Domain Signals 312 received at Pilot Phase Extraction Module 314 are processed with a parallel set of signal correlators (e.g., Signal Correlator 346-a, Signal Correlator 346-b, Signal Correlator 346-n, and the like). Each of the signal correlators in the parallel set of signal correlators correlates (e.g., performs a mathematical cross-correlation operation by performing a series of shift, multiply, and add operations) the received signal (e.g., Received Time-Domain Signals 312) with a respective pilot tone (e.g., each of the respective Pilot Tone Signals 347) to extract pilot phase values (e.g., Pilot Phase Values 348-a, Pilot Phase Values 348-b, Pilot Phase Values 348-n, and the like) corresponding to the respective pilot tones.

The signal receiver computes (618) a signal propagation time of the received time-domain signal, e.g., by performing operations 620-624. The signal receiver fits (620) an interpolation function to residual pilot phase values, corresponding to the extracted pilot phase values. For example, Interpolation Module 316 (FIG. 3B), fits an interpolation function (e.g., Interpolation function fitted to pilot phase values 506, FIG. 5A) to residual pilot phase values (e.g., computed by Residual Phase Extraction Module 318, FIG. 3B), corresponding to the extracted pilot phase values. In some embodiments, signal receiver fits an interpolation function to residual pilot phase values, corresponding to the extracted pilot phase values using interpolation methods (e.g., curve-fitting, polynomial interpolation, spline interpolation, Gaussian interpolation, regression-based methods, etc.). In some embodiments, the signal receiver fits (621) the interpolation function to the extracted pilot phase values.

The signal receiver determines (622) a slope of the interpolation function. In some embodiments, the slope, td, of the interpolation function corresponds to (624) a difference in residual phase, $2\pi\Delta f^* td$, between two pilot tones having a frequency difference of $\Delta f$. For example, Signal Propagation Time Estimation Module 320 (FIG. 3B) computes a Difference in residual phase ($2\pi\Delta f^* td$) between pilot tones 508 (FIG. 5A). Signal Propagation Time Estimation Module 320 (FIG. 3B) obtains Pilot tone frequencies 510 (e.g., Pilot Tone Frequencies 326, FIG. 3B), for example from an almanac and/or by referencing OFDM pilot tone frequencies defined by LTE specifications. Signal Propagation Time Estimation Module 320 then computes or otherwise obtains a Frequency difference ($\Delta f$) between pilot tones 512 (FIG. 5A). As explained above, Signal Propagation Time Estimation Module 320 computes Signal propagation time (td) or Slope of interpolation function 514 by dividing the Difference in residual phase ($2\pi\Delta f^* td$) between pilot tones 508 (FIG. 5A) by the Frequency difference ($\Delta f$) between the same pilot tones 512 (FIG. 5A).

The signal receiver computes (626) a range between the transmit location and the signal receiver by multiplying the computed signal propagation time with the speed of light. For example, Range Estimation Module 322 (FIG. 3B) obtains Range between transmit location and signal receiver 518 (e.g., Range 328, FIG. 3B) by multiplying Signal propagation time (td) 514 by the Speed of light 516 (FIG. 5A).

In some embodiments, the signal receiver computes (628) a first set of ranges, including said computed range, using signals received from a set of transmit locations at the signal receiver at a first time. In some implementations, each range in the first set of ranges is computed (630) by fitting an interpolation function to residual pilot phase values, corresponding to extracted pilot phase values, for a respective signal received by the signal receiver and by determining a slope of the interpolation function. For example, as explained above with reference to FIG. 5A, Signal Receiver 120 computes a first set of ranges, including First Computed Range (R1) 552-a (FIG. 5A), using signals received (e.g., Received Time-Domain Signals 312, FIGS. 3B-3D) from a set of transmit locations (e.g., Transmit Location(s)/Location(s) 130) at a corresponding (550-a) First Measured Time (t1) 554-a (FIG. 5A).

In some implementations, the signal receiver computes (632) a second set of ranges using the same signals received from the set of transmit locations at the signal receiver at a second time. For example, as explained above with reference to FIG. 5A, Signal Receiver 120 computes a second set of ranges, including Second Computed Range (R2) 552-b, using signals received (e.g., Received Time-Domain Signals 312, FIGS. 3B-3D) from a set of transmit locations (e.g., Transmit Location(s)/Location(s) 130) at a corresponding (550-a) Second Measured Time (t2) 554-b.

The signal receiver then computes (634) a set of range change rates based on the first set of ranges, the second set of ranges and a difference between the second time and the first time. The signal receiver computes (636) a speed of the signal receiver by combining the set of range change rates. For example, as explained above with reference to FIG. 5A, Signal Receiver 120 computes a respective Range Change ($\Delta$=R2−R1) 556 by subtracting First Computed Range (R1) 552-a from Second Computed Range (R2) 552-b. Signal Receiver 120 computes a difference between the second time (Second Measured Time (t2) 554-b) and the first time (First Measured Time (t1) 554-a) as Time Difference ($\Delta t$=t2−t1) 558. Signal Receiver 120 then computes a speed as a respective Range Change Rate ($\Delta R/\Delta t$) 560 by dividing Range Change 556 (as dividend) by Time Difference 558 (as divisor).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of computing a range from a transmit location to a signal receiver, the method comprising:
   receiving, at the signal receiver, a time-domain signal that includes a plurality of pilot tones at a plurality of corresponding frequencies, wherein the time-domain signal is transmitted from the transmit location;
   extracting from the received time-domain signal pilot phase values corresponding to the pilot tones;
   computing a signal propagation time, $t_d$, of the received time-domain signal, from the transmit location to the signal receiver, by fitting an interpolation function to residual pilot phase values, corresponding to the extracted pilot phase values, and determining a slope of the interpolation function; and
   computing a range between the transmit location and the signal receiver by multiplying the computed signal propagation time, $t_d$, with the speed of light.

2. The method of claim 1, wherein the slope of the interpolation function corresponds to a difference in residual phase, $2\pi\Delta f^* t_d$, between two pilot tones having a frequency difference of $\Delta f$.

3. The method of claim 1, wherein the transmit location corresponds to a terrestrial transmitter and the plurality of pilot tones are mutually orthogonal signals.

4. The method of claim 1, wherein computing a signal propagation time of the received time-domain signal comprises fitting the interpolation function to the extracted pilot phase values.

5. The method of claim 1, wherein extracting from the received time-domain signal pilot phase values corresponding to the pilot tones comprises sampling the received time-domain signal to generate a set of samples, performing a Fourier transform on the set of samples to produce a set of complex value pairs, comprising a pair of complex values for each pilot tone in a set of pilot tones that comprises at least a subset of the plurality of pilot tones, and extracting phase values from the set of complex value pairs to produce said pilot phase values.

6. The method of claim 1, wherein extracting from the received time-domain signal pilot phase values corresponding to the pilot tones comprises processing the received time-domain signal with a parallel set of signal correlators, each for correlating the received time-domain signal with a respective pilot tone.

7. The method of claim 1, further comprising:
   computing a first set of ranges, including said computed range, using signals received from a set of transmit locations at the signal receiver at a first time;
   computing a second set of ranges using the same signals received from the set of transmit locations at the signal receiver at a second time;
   computing a set of range change rates based on the first set of ranges, the second set of ranges and a difference between the second time and the first time;

computing a speed of the signal receiver by combining the set of range change rates;

wherein each range in the first set of ranges being computed by fitting an interpolation function to residual pilot phase values, corresponding to extracted pilot phase values, for a respective signal received by the signal receiver and determining a slope of the interpolation function.

8. The method of claim 1, wherein the signal receiver comprises a subsystem of a navigation system.

9. A signal receiver, comprising:
one or more processors;
memory; and
one or more programs, wherein the one or more programs are stored in the memory and configured to be executed by the one or more processors, the one or more programs including instructions for:
receiving, at the signal receiver, a time-domain signal that includes a plurality of pilot tones at a plurality of corresponding frequencies, wherein the time-domain signal is transmitted from a transmit location;
extracting from the received time-domain signal pilot phase values corresponding to the pilot tones;
computing a signal propagation time, $t_d$, of the received time-domain signal, from the transmit location to the signal receiver, by fitting an interpolation function to residual pilot phase values, corresponding to the extracted pilot phase values, and determining a slope of the interpolation function; and
computing a range between the transmit location and the signal receiver by multiplying the computed signal propagation time, $t_d$, with the speed of light.

10. The signal receiver of claim 9, wherein the slope of the interpolation function corresponds to a difference in residual phase, $2\pi\Delta f^* t_d$, between two pilot tones having a frequency difference of $\Delta f$.

11. The signal receiver of claim 9, wherein the transmit location corresponds to a terrestrial transmitter and the plurality of pilot tones are mutually orthogonal signals.

12. The signal receiver of claim 9, wherein the instructions for computing a signal propagation time of the received time-domain signal comprise instructions for fitting the interpolation function to the extracted pilot phase values.

13. The signal receiver of claim 9, wherein the instructions for extracting from the received time-domain signal pilot phase values corresponding to the pilot tones comprise instructions for sampling the received time-domain signal to generate a set of samples, performing a Fourier transform on the set of samples to produce a set of complex value pairs, comprising a pair of complex values for each pilot tone in a set of pilot tones that comprises at least a subset of the plurality of pilot tones, and extracting phase values from the set of complex value pairs to produce said pilot phase values.

14. The signal receiver of claim 9, wherein the instructions for extracting from the received time-domain signal pilot phase values corresponding to the pilot tones comprise instructions for processing the received time-domain signal with a parallel set of signal correlators, each for correlating the received time-domain signal with a respective pilot tone.

15. The signal receiver of claim 9, wherein the one or more programs further comprise instructions for:
computing a first set of ranges, including said computed range, using signals received from a set of transmit locations at the signal receiver at a first time;
computing a second set of ranges using the same signals received from the set of transmit locations at the signal receiver at a second time;
computing a set of range change rates based on the first set of ranges, the second set of ranges and a difference between the second time and the first time;
computing a speed of the signal receiver by combining the set of range change rates;
wherein each range in the first set of ranges being computed by fitting an interpolation function to residual pilot phase values, corresponding to extracted pilot phase values, for a respective signal received by the signal receiver and determining a slope of the interpolation function.

16. The signal receiver of claim 9, wherein the signal receiver comprises a subsystem of a navigation system.

17. A non-transitory computer readable storage medium storing one or more programs, the one or more programs comprising instructions, which when executed by a signal receiver with one or more processors, cause the signal receiver to:
receive, at the signal receiver, a time-domain signal that includes a plurality of pilot tones at a plurality of corresponding frequencies, wherein the time domain signal is transmitted from a transmit location;
extract from the received time-domain signal pilot phase values corresponding to the pilot tones;
compute a signal propagation time, $t_d$, of the received time-domain signal, from the transmit location to the signal receiver, by fitting an interpolation function to residual pilot phase values, corresponding to the extracted pilot phase values, and determining a slope of the interpolation function; and
compute a range between the transmit location and the signal receiver by multiplying the computed signal propagation time, $t_d$, with the speed of light.

18. The computer readable storage medium of claim 17, wherein the slope of the interpolation function corresponds to a difference in residual phase, $2\pi\Delta f^* t_d$, between two pilot tones having a frequency difference of $\Delta f$.

19. The computer readable storage medium of claim 17, wherein the transmit location corresponds to a terrestrial transmitter and the plurality of pilot tones are mutually orthogonal signals.

20. The computer readable storage medium of claim 17, wherein the instructions for computing a signal propagation time of the received time-domain signal comprise instructions for fitting the interpolation function to the extracted pilot phase values.

21. The computer readable storage medium of claim 17, wherein the instructions for extracting from the received time-domain signal pilot phase values corresponding to the pilot tones comprise instructions for sampling the received time-domain signal to generate a set of samples, performing a Fourier transform on the set of samples to produce a set of complex value pairs, comprising a pair of complex values for each pilot tone in a set of pilot tones that comprises at least a subset of the plurality of pilot tones, and extracting phase values from the set of complex value pairs to produce said pilot phase values.

22. The computer readable storage medium of claim 17, wherein the instructions for extracting from the received time-domain signal pilot phase values corresponding to the pilot tones comprise instructions for processing the received time-domain signal with a parallel set of signal correlators, each for correlating the received time-domain signal with a respective pilot tone.

23. The computer readable storage medium of claim 17, wherein the one or more programs further comprise instructions for:

computing a first set of ranges, including said computed range, using signals received from a set of transmit locations at the signal receiver at a first time;

computing a second set of ranges using the same signals received from the set of transmit locations at the signal receiver at a second time;

computing a set of range change rates based on the first set of ranges, the second set of ranges and a difference between the second time and the first time;

computing a speed of the signal receiver by combining the set of range change rates;

wherein each range in the first set of ranges being computed by fitting an interpolation function to residual pilot phase values, corresponding to extracted pilot phase values, for a respective signal received by the signal receiver and determining a slope of the interpolation function.

24. The computer readable storage medium of claim 17, wherein the signal receiver comprises a subsystem of a navigation system.

* * * * *